US012764405B2

(12) United States Patent
Park et al.

(10) Patent No.: US 12,764,405 B2
(45) Date of Patent: Oct. 13, 2026

(54) CAMERA MODULE INCLUDING A BASE WITH A FRAME PART AND A PROTRUSION PART

(71) Applicant: LG INNOTEK CO., LTD., Seoul (KR)

(72) Inventors: Jong Ha Park, Seoul (KR); Young Don Oh, Seoul (KR); Sang Yeon Han, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 81 days.

(21) Appl. No.: 18/843,526

(22) PCT Filed: Mar. 2, 2023

(86) PCT No.: PCT/KR2023/002873
§ 371 (c)(1),
(2) Date: Sep. 3, 2024

(87) PCT Pub. No.: WO2023/167510
PCT Pub. Date: Sep. 7, 2023

(65) Prior Publication Data

US 2025/0184588 A1 Jun. 5, 2025

(30) Foreign Application Priority Data

Mar. 2, 2022 (KR) ........................ 10-2022-0027059
Mar. 2, 2022 (KR) ........................ 10-2022-0027060
Jun. 8, 2022 (KR) ........................ 10-2022-0069775

(51) Int. Cl.
*H04N 23/55* (2023.01)
*G03B 11/00* (2021.01)
(Continued)

(52) U.S. Cl.
CPC ............. *H04N 23/55* (2023.01); *G03B 11/00* (2013.01); *G03B 17/12* (2013.01); *G03B 17/55* (2013.01);
(Continued)

(58) Field of Classification Search
CPC ........ H04N 23/55; H04N 23/54; H04N 23/57; H04N 23/00; G03B 11/00; G03B 17/12; G03B 17/55; G03B 30/00
See application file for complete search history.

(56) References Cited

U.S. PATENT DOCUMENTS 9,568,743 B2 * 2/2017 Hayashi .................. G03B 3/10
2004/0207036 A1 10/2004 Ikeda
(Continued)

FOREIGN PATENT DOCUMENTS

JP 2004-226873 A 8/2004
KR 10-2006-0040317 A 5/2006
(Continued)

OTHER PUBLICATIONS

International Search Report dated Jun. 2, 2023 in International Application No. PCT/KR2023/002873.

*Primary Examiner* — Padma Haliyur
(74) *Attorney, Agent, or Firm* — SALIWANCHIK, LLOYD & EISENSCHENK

(57) ABSTRACT

A camera module according to an embodiment includes a reinforcement plate; a circuit board disposed on the reinforcement plate and including a cavity; a sensor disposed in a region of an upper surface of the reinforcement plate overlapping the cavity of the circuit board in an optical axis direction; a base disposed on the circuit board; and a filter unit disposed on the base and overlapping the sensor on an optical axis, and wherein the base is a metal frame including a metal material.

19 Claims, 16 Drawing Sheets

(51) Int. Cl.

| | |
|---|---|
| ***G03B 17/12*** | (2021.01) |
| ***G03B 17/55*** | (2021.01) |
| ***G03B 30/00*** | (2021.01) |
| ***H04N 23/54*** | (2023.01) |
| ***H04N 23/57*** | (2023.01) |

(52) U.S. Cl.

CPC ............. *G03B 30/00* (2021.01); *H04N 23/54* (2023.01); *H04N 23/57* (2023.01)

(56) References Cited

U.S. PATENT DOCUMENTS

| | | | | |
|---|---|---|---|---|
| 2006/0098244 | A1 | 5/2006 | Choi et al. | |
| 2007/0241273 | A1 * | 10/2007 | Kim | H10F 39/806 250/239 |
| 2013/0250170 | A1 * | 9/2013 | Oh | G03B 17/02 348/374 |
| 2015/0229843 | A1 * | 8/2015 | Shimizu | H04N 23/6812 348/222.1 |
| 2017/0045753 | A1 | 2/2017 | Enta | |
| 2017/0214831 | A1 * | 7/2017 | Ha | H04N 23/55 |
| 2019/0148429 | A1 * | 5/2019 | Wang | H04N 23/57 348/294 |
| 2019/0170994 | A1 * | 6/2019 | Li | G02B 21/361 |
| 2022/0201169 | A1 * | 6/2022 | Huang | H04N 23/57 |
| 2022/0353396 | A1 * | 11/2022 | Kim | G02B 27/646 |
| 2024/0397205 | A1 * | 11/2024 | Wang | H04N 23/57 |

FOREIGN PATENT DOCUMENTS

| | | | |
|---|---|---|---|
| KR | 10-2012-0029208 | A | 3/2012 |
| KR | 10-2016-0146680 | A | 12/2016 |
| KR | 10-2020-0046267 | A | 5/2020 |
| KR | 10-2021-0024215 | A | 3/2021 |
| KR | 10-2021-0142956 | A | 11/2021 |

* cited by examiner (a)

(b)

(a)

(b)

(a)

(b)

(a)

(b)

CAMERA MODULE INCLUDING A BASE WITH A FRAME PART AND A PROTRUSION PART

CROSS-REFERENCE TO RELATED APPLICATIONS

This application is the U.S. national stage application of International Patent Application No. PCT/KR2023/002873, filed Mar. 2, 2023, which claims the benefit under 35 U.S.C. § 119 of Korean Application Nos. 10-2022-0027059, filed Mar. 2, 2022; 10-2022-0027060, filed Mar. 2, 2022; and 10-2022-0069775, filed Jun. 8, 2022; the disclosures of each of which are incorporated herein by reference in their entirety.

TECHNICAL FIELD

An embodiment relates to a camera module and an optical device including the same.

BACKGROUND ART

Recently, an ultra-small camera module has been developed. In addition, the ultra-small camera module is widely used in small electronic products such as smartphones, laptops, and game consoles.

That is, most mobile electronic devices, including smartphones, are equipped with a camera device for obtaining an image from an object. In this case, mobile electronic devices are gradually becoming smaller for convenient portability.

These camera modules generally include a lens in which light is incident, an image sensor in which light is incident through the lens is captured, and a plurality of components for transmitting and receiving electrical signals for images obtained from the image sensor to electronic devices equipped with the camera module. In addition, the image sensor and the plurality of components are generally mounted on a printed circuit board and connected to external electronic devices.

In this case, in a case of the camera module applied to the electronic device as described above, an impact may be frequently applied to the camera module during use. In addition, the camera module may cause a slight shaking during a photographing operation due to a user's hand shaking, etc. Accordingly, the camera module is equipped with an optical image stabilization function.

On the other hand, the camera module as described above includes a filter mounting part called an inner base, holder, or sensor base placed between the lens module and the image sensor.

However, the filter mounting part according to a conventional technology is provided as a part that is injected using a resin. Accordingly, there is a limit to reducing a thickness of the filter mounting part according to the conventional technology. In addition, there is a limit to reducing a FBL (Flange Back Length), which is a vertical distance between the lens and the image sensor, due to the limit of a minimum thickness of the filter mounting part. For example, a part manufactured by injection molding has a problem in that the extractability from a mold deteriorates as the thickness decreases. In addition, a part manufactured by injection molding has a problem in that deformation occurs during extraction from the mold as the thickness decreases. Accordingly, the filter mounting part according to the conventional technology must have a thickness of a certain level or more.

In addition, a size of the sensor is increasing as a resolution of the camera module increases, and a size of the filter is also increasing as the size of the sensor increases. In the case of the filter mounting part manufactured by injection according to the conventional technology, there is a limit to increasing the size due to flatness and warpage problems.

Accordingly, a new structure of the filter mounting part is required to maintain a certain level of flatness even if the thickness is reduced, and to maintain a certain level of rigidity even if a size in a horizontal direction increases.

DISCLOSURE

Technical Problem

An embodiment provides a camera module including a base of a new structure and an optical device including the same.

In addition, the embodiment provides a camera module including a base containing an ultraviolet curable material directly bonded to the filter and an optical device including the same.

In addition, the embodiment provides a camera module capable of reducing a thickness of the base and an optical device including the same.

In addition, the embodiment provides a camera module capable of improving design freedom and an optical device including the same.

In addition, the embodiment provides a camera module capable of removing an injection base provided in a conventional technology and an optical device including the same.

In addition, the embodiment provides a camera module capable of securing rigidity of a base and an optical device including the same.

In addition, the embodiment provides a camera module capable of improving flatness and bending characteristics of a filter and an optical device including the same.

In addition, the embodiment provides a camera module capable of reducing a FBL and an optical device including the same.

In addition, the embodiment provides a camera module having a miniaturization structure and an optical device including the same.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A camera module according to an embodiment comprises a reinforcement plate; a circuit board disposed on the reinforcement plate and including a cavity; a sensor disposed in a region of an upper surface of the reinforcement plate that overlaps the cavity of the circuit board along an optical axis; a base disposed on the circuit board; and a filter unit disposed on the base and overlapping the sensor along the optical axis, wherein the base is a metal frame including a metal material.

In addition, the base includes: a frame part; and a protrusion part protruding toward the sensor from an edge region of a lower surface of the frame part, and wherein the filter unit is disposed on an upper surface of the frame part.

In addition, the upper surface of the frame part is flat.

In addition, the base does not overlap the filter unit in a direction perpendicular to the optical axis.

In addition, the frame part includes an opening overlapping the sensor and the filter unit along the optical axis, and an area of the opening of the frame part is smaller than an area of the filter unit.

In addition, the camera module further comprises a connection member connecting a terminal of the sensor and a pad of the circuit board, wherein an uppermost end of the connection member is positioned higher than an upper surface of the circuit board, and an upper surface of the frame part is positioned higher than the uppermost end of the connection member.

In addition, a thickness of the protrusion part satisfies a range of 150 μm to 250 μm.

In addition, the base includes a through hole passing through the frame part.

In addition, a thickness of the frame part satisfies a range of 120 μm to 160 μm.

In addition, a total thickness of the base including the frame part and the protrusion part satisfies a range of 270 μm to 410 μm.

In addition, an upper surface of the frame part includes a first portion with a first height and a second portion having a step with the first portion and a second height higher than the first height, and the filter unit is disposed on the first portion of the frame part.

In addition, the base contains a non-magnetic metallic material.

In addition, the camera module further includes an adhesive part disposed between the circuit board and the base.

In addition, the circuit board includes a ground pattern, and the adhesive part is disposed on the ground pattern.

A camera module according to the embodiment comprises a reinforcement plate; a circuit board disposed on the reinforcement plate and including a cavity; a sensor disposed on an upper surface of the reinforcement plate in a region overlapping the cavity of the circuit board along an optical axis; a filter unit disposed on the circuit board; and the filter unit includes a filter and a base integrated with the filter.

In addition, the base includes a curable material cured on a lower surface of the filter.

In addition, the base includes an ultraviolet curable material.

In addition, an upper surface of the base directly contacts a lower surface of the filter.

In addition, the base is disposed in a frame shape at an edge region of a lower surface of the filter.

In addition, an outer width of the base is smaller than an outer width of the filter.

In addition, the base is positioned spaced inward from an outer end of the lower surface of the filter.

In addition, a width between an outer end of the base and an outer end of the filter satisfies a range of 30 μm to 100 μm.

In addition, the camera module further includes a connection member connecting a terminal of the sensor and a pad of the circuit board, an uppermost end of the connection member is higher than an upper surface of the circuit board, and a lower surface of the filter is higher than the uppermost end of the connection member.

In addition, a thickness of the base satisfies a range of 150 μm to 450 μm.

In addition, the camera module further includes an adhesive part disposed between the circuit board and the base.

In addition, the circuit board includes a ground pattern, and the adhesive part is disposed on the ground pattern.

Meanwhile, the camera module according to the embodiment includes a reinforcement plate; a circuit board disposed on the reinforcement plate and including a first hole; a sensor disposed on the reinforcement plate and accommodated in the first hole; a base disposed on the circuit board and including a second hole; a filter disposed in the second hole of the base and disposed to correspond to the sensor; and a lens disposed on the base and the filter; and the base is made of a metal material and is soldered to the circuit board.

In addition, the base has a thickness of 0.1 mm or more and 0.4 mm or less based on an optical axis direction.

In addition, the filter has a thickness of 0.1 mm or more and 0.2 mm or less based on the optical axis direction.

In addition, the filter is surrounded by the sensor base in a direction perpendicular to the optical axis direction.

In addition, the circuit board includes a first portion connected to the sensor by a wire and a second portion on which the sensor base is arranged, and the first portion and the second portion of the circuit board has a step structure.

Effects of the Invention

The camera module of the embodiment includes a filter module. The filter module is disposed on a circuit board electrically connected to a sensor. In this case, the filter module includes a filter unit and a base. In this case, the base may be integrated with the filter unit. Here, the integration may mean that there are no additional components between the base and the filter unit. Specifically, the embodiment may omit an adhesive member for attaching the filter unit to the base.

Specifically, a base in a prior art is manufactured separately from the filter unit. For example, the base in the prior art is an injection product injected with an insulating material. In the prior art, a process of bonding the base and the filter unit using an adhesive member is performed after the base is manufactured through an injection process.

In contrast, in the embodiment, the filter unit is disposed in a state in which an ultraviolet curable material is applied. In addition, an ultraviolet curing process may be performed in a state in which the ultraviolet curable material before curing is disposed under the filter unit. Accordingly, the embodiment allows a process of manufacturing the base and a process of combining the base and the filter unit to be performed in one process, thereby simplifying a manufacturing process. Furthermore, the embodiment may reduce a manufacturing cost of the base. Accordingly, the embodiment may reduce a product unit price of the camera module.

In addition, an embodiment may reduce a thickness of the filter module by omitting the adhesive member additionally disposed between the base and the filter unit. For example, the embodiment may reduce a thickness of the filter module by a thickness of the adhesive member. Accordingly, the embodiment may reduce the FBL of the camera module.

In addition, the embodiment may reduce a width (or plane area) of the filter module. For example, in the prior art, a width or plane area of the base was greater than a width or plane area of the filter unit. Accordingly, in the prior art, the width of the filter module was determined by a width of the base. Accordingly, in the prior art, an area of a space for arranging the filter module is greater than an area of the filter unit. Accordingly, in the prior art, a width of the camera module is increased, and accordingly, an overall volume of the camera module is increased.

Alternatively, a width of the base in the embodiment is smaller than a width of the filter module. In addition, in the embodiment, a width of the filter module is determined not by a width of the base, but by a width of the filter unit. Accordingly, the embodiment can reduce an area of a space in which the filter module is disposed compared to the prior art. Accordingly, the embodiment can reduce a width of the camera module, and accordingly, an overall volume (e.g., width and/or height) of the camera module can be reduced.

In addition, the embodiment may provide a base corresponding to a size and shape of the filter unit. That is, in the prior art, since the base is manufactured by an injection process, it may be difficult to apply a filter having various sizes or shapes. In addition, there is a problem in that the bonding reliability between the base and the filter unit is deteriorated according to the injection process. However, in the embodiment, since the base is integrated with the filter unit, it is possible to correspond to various shapes and sizes of the filter unit. Accordingly, the embodiment may improve design freedom. Furthermore, the embodiment can improve the coupling reliability between the filter unit and the base by providing a base integrated with the filter unit. As a result, the embodiment can improve operational reliability and product reliability of the camera module.

Meanwhile, the embodiment may reduce a thickness of the base compared to the prior art. Specifically, in the prior art, the base is manufactured by an injection process. Accordingly, in the prior art, a non-molding issue in the injection process, a deformation issue in an extraction process after the injection, and a flatness issue of the filter unit must be considered. Accordingly, in the prior art, there is a limit to reducing a thickness of the base. In contrast, the embodiment provides a base integrated with the filter unit by performing an ultraviolet curing process. Accordingly, the embodiment does not need to consider an non-molding issue and a deformation issue in the prior art. Accordingly, the embodiment may reduce a minimum thickness of the base compared to the prior art. Accordingly, the embodiment can reduce the manufacturing cost by reducing the thickness of the base, and further lower the unit price of the product. In addition, the embodiment may reduce a flange back length (FBL) in response to the reduced thickness of the base. Accordingly, the embodiment may reduce an overall thickness or volume of the camera module.

Meanwhile, the filter module in an embodiment may be connected to a ground pattern included in the circuit board. For example, the circuit board in an embodiment includes a ground pattern exposed through an opening of the protective layer. In addition, an adhesive part for coupling or attaching the filter module to or to the circuit board may be disposed on the ground pattern. Accordingly, the embodiment may further improve coupling reliability between the circuit board and the filter module. Further, the embodiment allows heat transferred to the filter module to be discharged through the ground pattern of the circuit board. Accordingly, the embodiment may further improve heat dissipation characteristics of the camera module.

Meanwhile, the embodiment includes a base on which the filter unit is seated. At this time, the base includes a metal material. Specifically, the base on which the filter unit is seated may be a metal frame manufactured by any one of a metal press method, a die casting method, and a metal insert mold (MIM) method. In addition, the metal frame functions as a seating part on which the filter unit is seated. Accordingly, in the embodiment, since the seating part on which the filter unit is seated is made of a metal material, the filter unit may be stably seated on the base. In addition, the embodiment may improve a flatness of the filter unit seated on the base.

Meanwhile, a size of the sensor is increasing according to the demand for high resolution, and a size of the filter unit is also increasing accordingly. In this case, there is a limit to a size of the filter unit that may be seated on a seating part injected with an insulating material of a comparative example. Alternatively, in the embodiment, the base corresponding to the seating part is formed of a metal material. Accordingly, the embodiment may provide a base capable of responding to an increase in the size of the filter unit. Furthermore, the embodiment may increase the size of the filter unit that can be settled while maintaining the flatness of the filter unit compared to the comparative example.

Meanwhile, the base in an embodiment includes a black-coated coating layer. The coating layer inhibits light passing through the lens and filter from being reflected through the base. Accordingly, the embodiment may improve the image quality of the camera module.

In addition, the base in the embodiment is formed of a non-magnetic material. Accordingly, the embodiment may solve a problem in which operating characteristics of the sensor driving device are deteriorated due to the base. When the base is made of a magnetic material, magnetic interference may occur in an interaction between a coil and a magnet of a sensor driving device. In addition, the operating characteristics of the sensor driving device may be deteriorated due to the magnetic interference. Unlike this, the base according to the embodiment includes a non-magnetic material. Accordingly, the embodiment may achieve an effect of maintaining flatness of the filter unit and reducing FBL without affecting the operating characteristics of the sensor driving device.

BEST MODE

Figure 1:
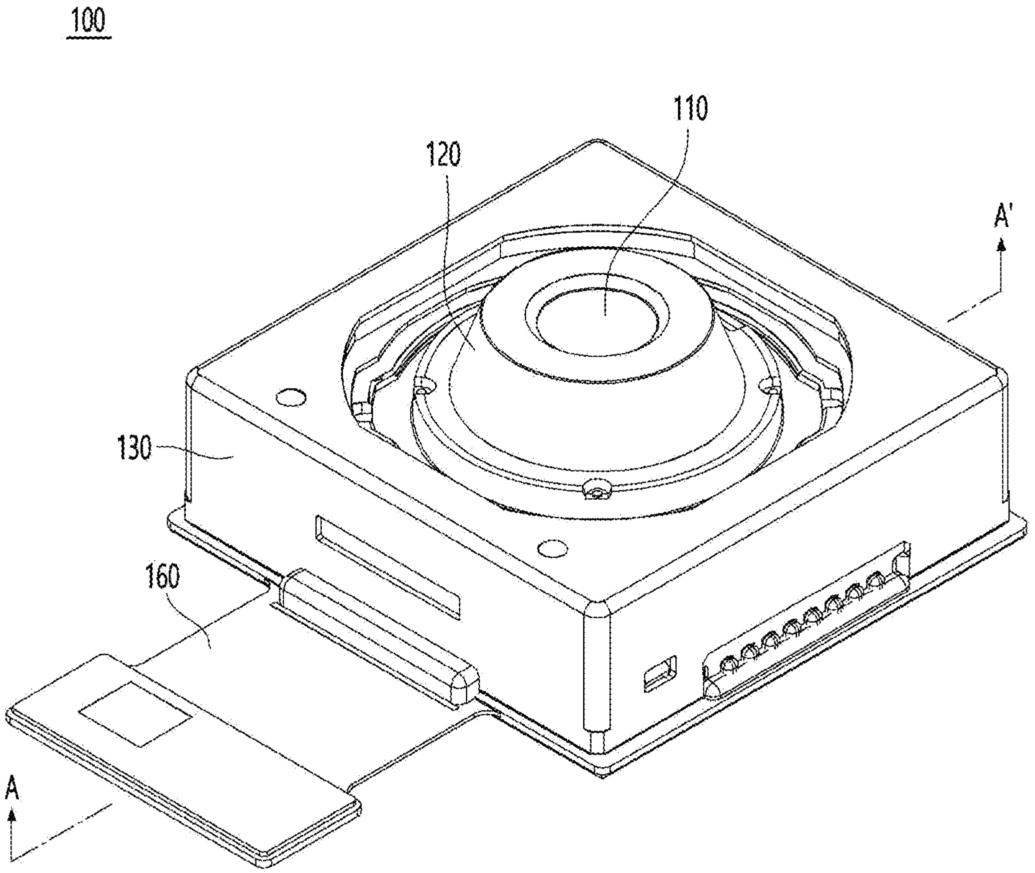
FIG. 1 is a perspective view of a camera module according to a first embodiment.

Hereinafter, embodiments of the present disclosure will be described in detail with reference to the accompanying drawings.

However, the spirit and scope of the present disclosure is not limited to a part of the embodiments described, and may be implemented in various other forms, and within the spirit and scope of the present disclosure, one or more of the elements of the embodiments may be selectively combined and replaced.

In addition, unless expressly otherwise defined and described, the terms used in the embodiments of the present disclosure (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present disclosure are for describing the embodiments and are not intended to limit the present disclosure. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present disclosure, the terms such as first, second, A, B, (a), and (b) may be used. These terms are only used to distinguish the elements from other elements, and the terms are not limited to the essence, order, or order of the elements. In addition, when an element is described as being "connected", "coupled", or "contacted" to another element, it may include not only when the element is directly "connected" to, "coupled" to, or "contacted" to other elements, but also when the element is "connected", "coupled", or "contacted" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements. Furthermore, when expressed as "on (over)" or "under (below)", it may include not only an upper direction but also a lower direction based on one element.

Hereinafter, an optical axis direction used may be defined as an optical axis direction of a lens coupled to a camera actuator and a camera module, and a vertical direction may be defined as a direction perpendicular to the optical axis.

An auto-focus function used below may be defined as a function that automatically focuses on a subject by moving the lens in the optical axis direction according to a distance of the subject so that a clear image of the subject can be obtained on an image sensor.

Meanwhile, the auto focus may correspond to AF. Also, closed-loop auto-focus (CLAF) control may be defined as real-time feedback (feedback) control of a position of a lens by sensing a distance between an image sensor and the lens to improve accuracy of focus control.

Also, before describing the embodiments of the invention, a first direction may refer to a x-axis direction illustrated in the drawing, and a second direction may be a direction different from the first direction. For example, the second direction may refer to a y-axis direction illustrated in the drawing and a direction perpendicular to the first direction. Also, a third direction may be a direction different from the first and second directions. For example, the third direction may refer to a z-axis direction illustrated in the drawing and a direction perpendicular to the first and second directions. Here, the third direction may refer to an optical axis direction.

Hereinafter, a camera module and an optical device including the same according to an embodiment will be described in detail.

Figure 2:
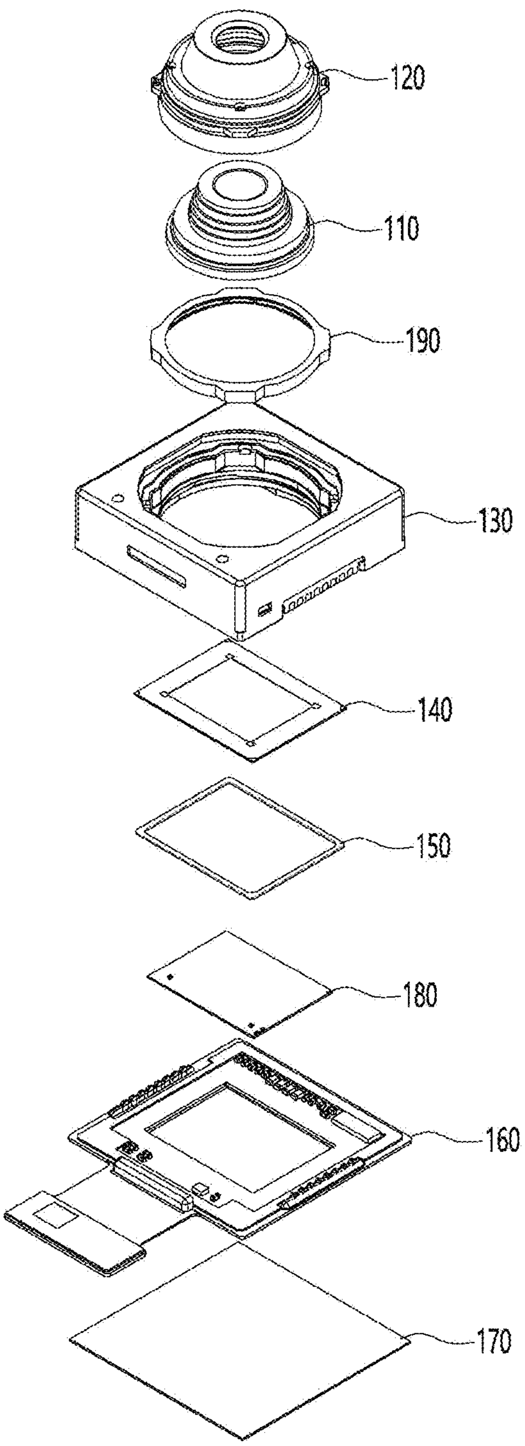
FIG. 2 is an exploded perspective view of a camera module according to a first embodiment.
Figure 3:
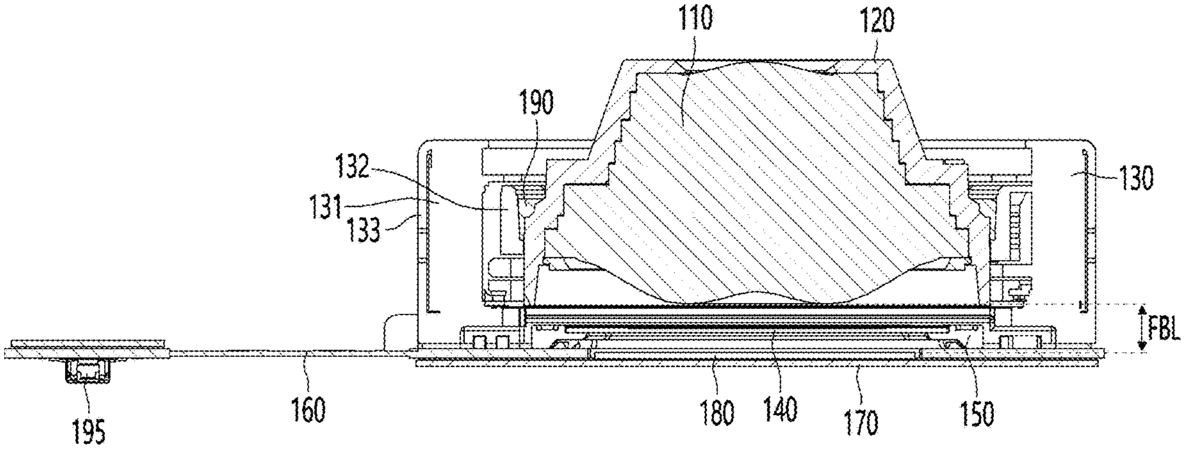
FIG. 3 is a cross-sectional view of the camera module of FIG. 1 in a direction A-A'.
Figure 4:
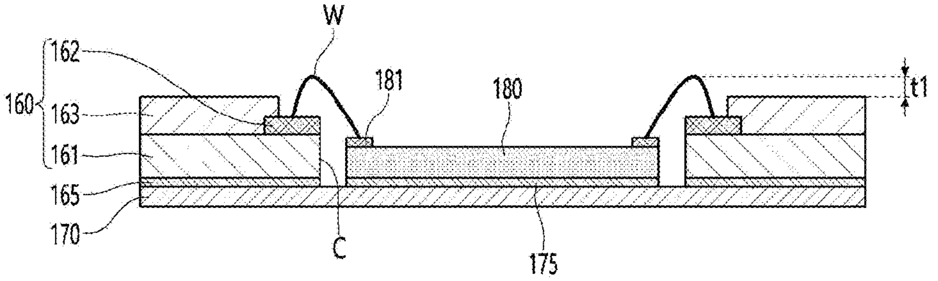
FIG. 4 is an enlarged view of a partial region of FIG. 3.
Figure 5:
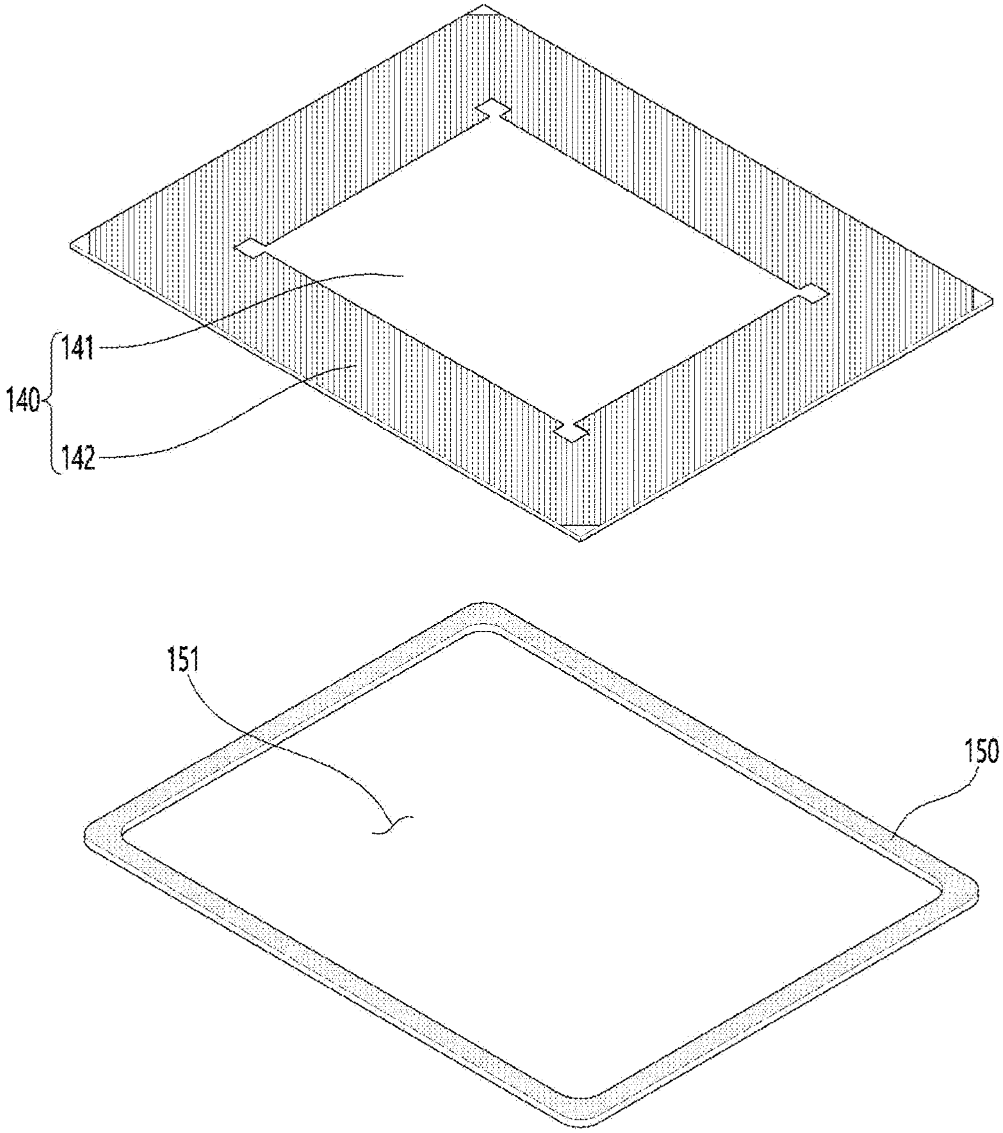
FIG. 5 is an exploded perspective view of a filter module according to a first embodiment.
Figure 6A:
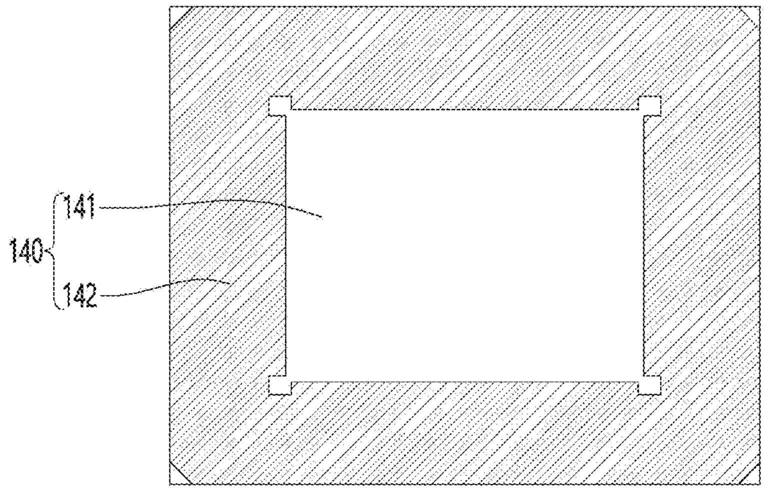
FIGS. 6(*a*) and 6(*b*) are plan views of a filter module according to a first embodiment.
Figure 6B:
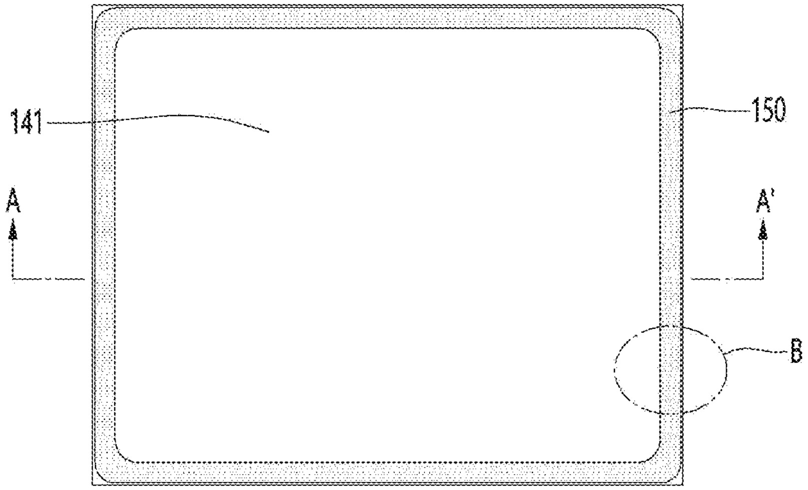
Figure 7:
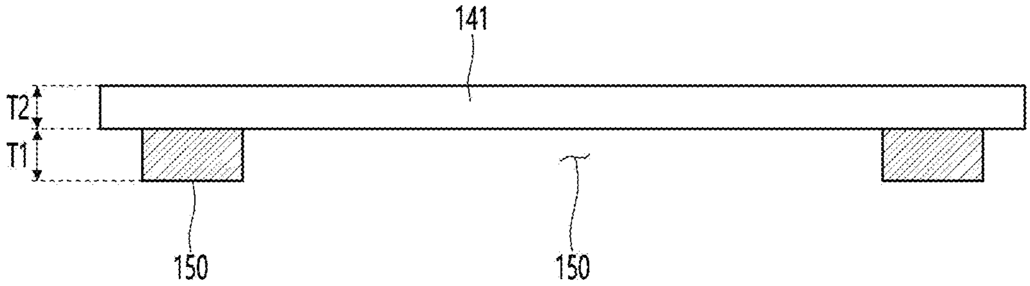
FIG. 7 is a cross-sectional view of a filter module according to a first embodiment taken along a direction A-A'.
Figure 8:
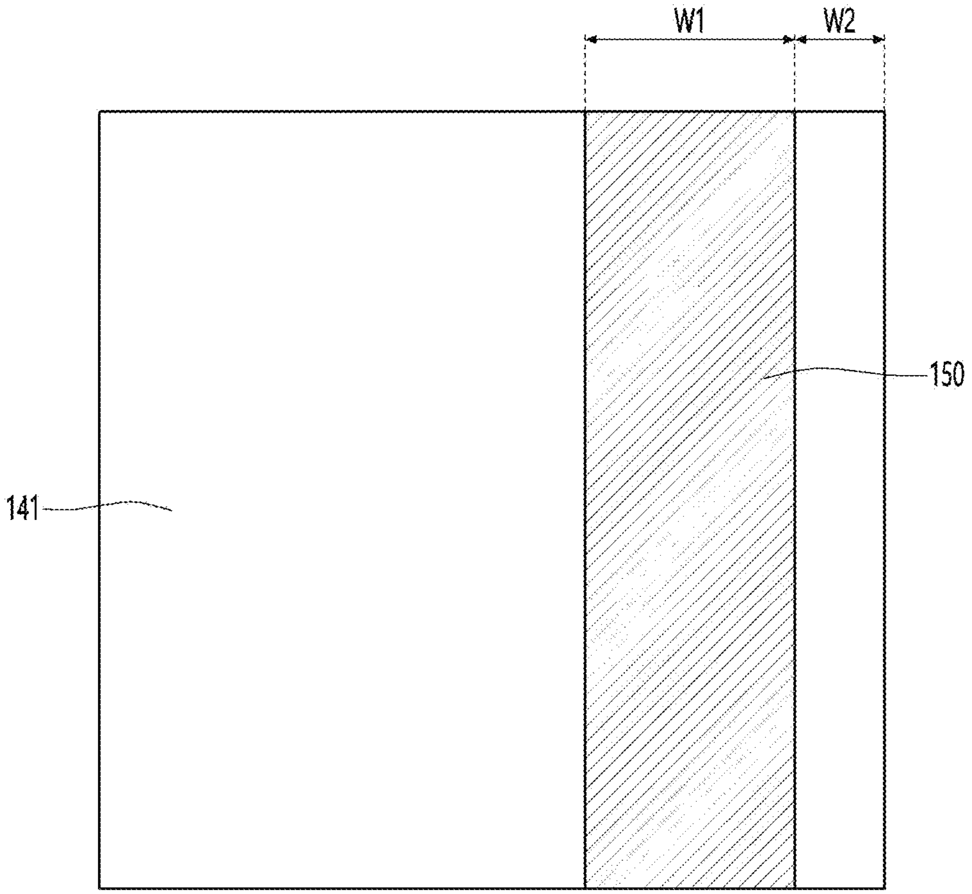
FIG. 8 is an enlarged view of a partial region of FIGS. 6(*a*) and 6(*b*).
Figure 9:
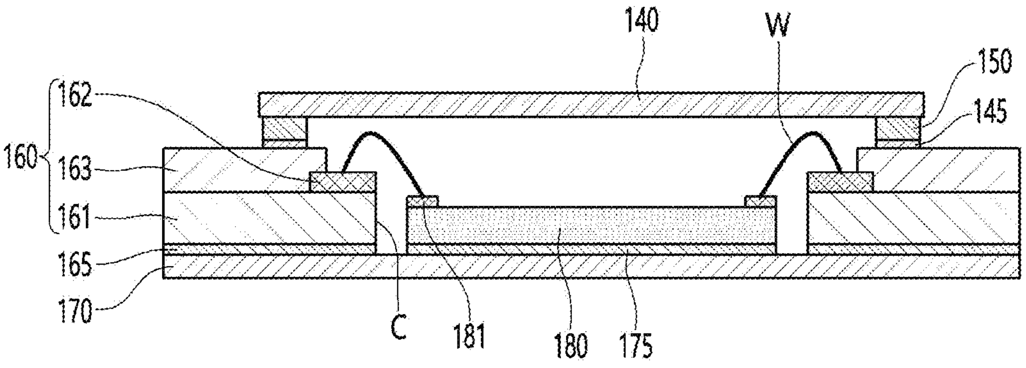
FIG. 9 is a coupling view of a filter module and a circuit board according to a first embodiment.

FIG. 1 is a perspective view of a camera module according to a first embodiment, FIG. 2 is an exploded perspective view of a camera module according to a first embodiment, FIG. 3 is a cross-sectional view of the camera module of FIG. 1 in a direction A-A', FIG. 4 is an enlarged view of a partial region of FIG. 3, FIG. 5 is an exploded perspective view of a filter module according to a first embodiment, FIGS. 6(*a*) and 6(*b*) are plan views of a filter module according to a first embodiment, FIG. 7 is a cross-sectional view of a filter module according to a first embodiment taken along a direction A-A', FIG. 8 is an enlarged view of a partial region of FIGS. 6(*a*) and 6(*b*), and FIG. 9 is a coupling view of a filter module and a circuit board according to a first embodiment.

In addition, FIG. 6(*a*) is a plan view of a filter module (e.g., a plan view from a location where the lens is placed), and FIG. 6(*b*) is a bottom view of the filter module (e.g., a bottom view from a location where the sensor is placed).

Hereinafter, the camera module of the first embodiment will be described in detail with reference to FIGS. 1 to 9.

The camera module 100 according to an embodiment may include a lens 110, a lens barrel 120, a lens driving device 130, a filter unit 140, a base 150, a circuit board 160, a reinforcement plate 170, a sensor 180, and an adhesive part 190.

Here, the camera module 100 may be represented by being replaced with a photographer or a photographing device. Also, the base 150 may be represented by being replaced with a holder, a sensor base, an inner base, a filter mounting part, or a filter seating part. Also, the lens driving device 130 may be referred to as an actuator for driving the lens 110 or the lens barrel 120.

The lens 110 or the lens barrel 120 may be coupled to the lens driving device 130. For example, the lens 110 or the lens barrel 120 may be mounted on the lens driving device 130.

For example, the lens 110 may be mounted within the lens barrel 120. The lens barrel 120 may be mounted on the lens driving device 130.

In this case, the lens driving device 130 includes a bobbin (not shown). And, the lens barrel 120 may be coupled to the bobbin of the lens driving device 130.

An adhesive part 190 may be disposed between an outer surface of the lens barrel 120 and an inner surface of the bobbin of the lens driving device 130. And the lens barrel 120 may be coupled to the bobbin of the lens driving device 130 through the adhesive part 190. In this case, the lens barrel 120 may move together with the bobbin corresponding to a moving part of the lens driving device 130. As will be described later, the lens driving device 130 includes a fixed part having a fixed position and a moving part moving with respect to the fixed part. Also, the bobbin is included in the moving part of the lens driving device 130. In this case, the lens barrel 120 is coupled to the bobbin of the moving part of the lens driving device 130. Accordingly, when the moving part of the lens driving device 130 moves, the lens barrel 120 may move together with the moving part.

That is, the lens driving device 130 may drive the lens barrel 120 coupled with the lens 110.

The lens 110 may be an optical system in which three or more lenses are stacked. The lens 110 may be an optical system in which five or more lenses are stacked. The lens 110 may be an optical system in which eight or more lenses are stacked. In this case, although the lens 110 is shown to include eight lenses in the drawing, the embodiment is not limited thereto. For example, the lens 110 may have a stacked structure of less than 8 sheets, or alternatively, may have a stacked structure of 9 sheets or more.

The lens 110 may include a lens made of a plastic material. The lens 110 according to an embodiment of the present invention may include a first lens unit made of a plastic material and a second lens unit made of a glass material. And, a number of lenses in the first lens unit made of the plastic material may be greater than a number of lenses in the second lens unit made of the glass material. For example, the number of lenses in the first lens unit made of the plastic material may be two or more.

In an embodiment, the lens 110 may be stacked with plastic lenses and/or glass lens(s). Here, a coefficient of thermal expansion (CTE) of the plastic material is higher than a coefficient of thermal expansion (CTE) of the glass material by five times or more, and a change value of a refractive index ($|dN/Dt|$) according to a function of temperature may be higher than that of the plastic material by ten times or more. Here, dN is a change value of a refractive index of the lens, and dT is a change value of a temperature.

Furthermore, the camera module 100 may be any one of a camera module for an auto focus (AF) and a camera module for an optical image stabilizer (OIS). A camera module for AF refers to one that can only perform the autofocus function. A camera module for OIS refers to one that performs both the autofocus function and the OIS function.

For example, the lens driving device 130 may be a lens driving device for AF or a lens driving device for OIS. Here, the meanings "for AF" and "for OIS" may be the same as those described in the camera module for AF and the camera module for OIS.

For example, the lens driving device 130 of the camera module 100 may be a lens driving device for OIS.

The lens driving device 130 may include a housing 131 and a bobbin 132 disposed in the housing 131 and coupled to the lens barrel 120.

Also, although not specifically shown in the drawing, the lens driving device 130 may include a first coil (not shown) coupled to the bobbin 132. Also, the lens driving device 130 may include a magnet (not shown) coupled to the housing 131 and opposite to the first coil.

Also, the lens driving device 130 may include at least one upper elastic member (not shown) coupled to an upper portion of the housing 131 and an upper portion of the bobbin 132. Also, the lens driving device 130 may include at least one lower elastic member (not shown) coupled to a lower portion of the housing 131 and a lower portion of the bobbin 132.

Also, the lens driving device 130 may include a second coil (not shown) disposed under the bobbin 132 or the housing 131. Also, the lens driving device 130 may include a driving substrate (not shown) disposed under the second coil. Also, the lens driving device 130 may include a frame part (not shown) disposed under the driving substrate.

Meanwhile, the bobbin 132 may also be referred to as a holder to which the lens barrel 120 is coupled.

In addition, the lens driving device 130 may include a cover member 133 coupled to the frame part and providing a space for accommodating components of the lens driving device 130 together with the frame part.

Further, the lens driving device 130 may further include a support member (not shown) supporting the housing 131 with respect to the frame part while electrically connecting the driving substrate to the upper elastic member. Each of the first coil and the second coil may be electrically connected to a driving substrate and may receive a driving signal (driving current) from the driving substrate.

The lens driving device 130 according to an embodiment may move the bobbin 132 and the lens barrel 120 to be coupled to the bobbin 132 in the optical axis direction by an electromagnetic force by an interaction between the first coil and the magnet. In addition, positions of the lens barrel 120 and the lens 110 coupled to the lens barrel 120 in the optical axis direction may be controlled by the electromagnetic force. Accordingly, AF driving may be implemented.

In addition, in the lens driving device 130, the housing 131 may be moved in a direction perpendicular to the optical axis direction by an electromagnetic force caused by an interaction between the second coil and the magnet. Accordingly, shake correction or OIS driving may be implemented.

The filter unit 140 may be mounted or disposed on the base 150.

Preferably, the base 150 may be attached to the filter unit 140. That is, the base 150 of the embodiment may include a cured material. In addition, the base 150 may be cured while disposed on a lower surface of the filter unit 140. Accordingly, the base 150 may directly contact the filter unit 140. For example, the filter unit 140 and the base 150 may be integrated. Here, the integration does not mean that the filter unit 140 and the base 150 include the same material and are formed as one body. That is, the integration may mean that other components are not disposed between the filter unit 140 and the base 150.

That is, the base 150 is disposed on a lower surface of the filter unit 140 before curing. In addition, the base 150 may be cured in a state disposed on the lower surface of the filter unit 140. Accordingly, the base 150 may be integrally formed with the filter unit 140.

Accordingly, in the embodiment, there is no additional adhesive member between the base 150 and the filter unit 140. And in the embodiment, a vertical distance from a lower surface of the base 150 to an upper surface of the filter unit 140 may be reduced by removing an adhesive member disposed between the base 150 and the filter unit 140. In addition, in the embodiment, FBL may be reduced by reducing the vertical distance.

The base 150 may be disposed on a lower surface of the filter unit 140 to have a frame shape. Specifically, the base

150 may have a rectangular frame shape. However, the embodiment is not limited thereto. For example, the base 150 may have a shape other than a rectangular frame shape.

However, a shape of the base 150 may correspond to a shape of the filter unit 140. For example, the filter unit 140 may have a rectangular flat plate shape. In addition, the base 150 may have a rectangular frame shape to correspond to the shape of the filter unit 140.

The base 150 includes a curable material. Preferably, the base 150 includes an ultraviolet curable material. For example, the base 150 may include an ultraviolet curable epoxy that can be cured by irradiation with ultraviolet rays, but is not limited thereto.

Meanwhile, a base in a prior art is manufactured separately from the filter unit. For example, the base in the prior art is an injection product injected with an insulating material. In addition, in the prior art, a process of combining the base and the filter unit using an adhesive member is performed after the base is manufactured through an injection process.

In contrast, in the embodiment, the filter unit is disposed in a state in which the ultraviolet curable material is applied. In addition, an ultraviolet curing process may be performed in a state in which an ultraviolet curable material before curing is disposed under the filter unit. Accordingly, in the embodiment, a process of manufacturing the base and a process of combining the base and the filter unit may be performed at a same time, thereby simplifying the manufacturing process.

In addition, the embodiment may respond to various shapes and sizes of the filter unit 140 by providing the base 150 integrated with the filter unit 140 as described above. Furthermore, an embodiment may further improve the coupling reliability of the filter unit 140 and the base 150 as there is no additional adhesive member between the filter unit 140 and the base 150.

Meanwhile, the base 150 is disposed at an edge region of a lower surface of the filter unit 140. In this case, the base 150 is disposed to be spaced apart inward at a predetermined interval from the edge region of the lower surface of the filter unit 140. For example, an outermost end of the base 150 may be located closer to the optical axis than an outermost end of the filter unit 140. For example, an outermost end of the base 150 may be located further inward than an outermost end of the filter unit 140.

Accordingly, an embodiment may reduce a width of a filter module including the base 150 and the filter unit 140. For example, in the prior art, a width of the base was larger than a width of the filter unit. For example, an outermost end of the base in the prior art is located further outward than an outermost end of the filter unit. Accordingly, in the prior art, a width of the filter module is determined by a width of the base, not a width of the filter unit. In addition, in the prior art, when a size of the filter unit increases, a size of the base has increased more than the degree of increase in the size of the filter unit to stably support it. Accordingly, the prior art has increased an area of a space required for the filter module to be disposed. Accordingly, the prior art has a problem of increasing an overall width and thickness of the camera module.

Alternatively, a width of the filter module of the embodiment is determined not by a width of the base 150, but by a width of the filter unit 140. For example, when a filter unit of the same size as that of the prior art is applied, a width of the filter module in the embodiment is smaller than a width of the filter module in the prior art. Accordingly, the embodiment can reduce an area of a space required for arranging the filter module within the camera module. Accordingly, the embodiment can reduce an overall width and thickness of the camera module.

In addition, the embodiment can reduce a minimum thickness that the base 150 must have because the base 150 is integrated with the filter unit 140. For example, as in the prior art, the base is an injection product manufactured using an insulating material. Accordingly, in the prior art, a thickness of the base is determined in consideration of injection properties and extractability in an injection process.

For example, the base in the prior art should consider a thickness of a protrusion part corresponding to a protrusion height of the connection member (described later), a thickness of a seating part in which the filter unit can be stably seated, and a thickness of an injection product that can be injected. Accordingly, there is a limit to reducing a thickness of the base in the prior art.

Alternatively, the base 150 of the embodiment is integrated with the filter unit 140. Accordingly, the base 150 of the embodiment may even function as a seating part by a protrusion part of the base in the prior art. Accordingly, the embodiment may reduce the thickness of the base 150 by the thickness of the seating part of the prior art. Furthermore, the embodiment does not require any consideration of the injection or extractability of the prior art. Accordingly, the embodiment may reduce a minimum total thickness that the base 150 must have compared to the prior art. Accordingly, the embodiment may reduce a flange back length (FBL) by reducing a thickness of the base 150.

Meanwhile, the base 150 is disposed on the lower surface of the filter unit 140 in a square frame shape. Specifically, the base 150 overlaps a part of a lower surface of the filter unit 140 in an optical axis. Preferably, the base 150 has an opening overlapping at least a part of a lower surface of the filter unit 140 in an optical axis. For example, the base 150 may have a structure protruding toward the sensor 180 only in a part of the lower surface of the filter unit 140.

The filter unit 140 is disposed on the base 150. Preferably, the filter unit 140 is integrated with the base 150. That is, the filter unit 140 is directly attached onto the base 150. For example, there is no additional component between the filter unit 140 and the base 150. For example, a lower surface of the filter unit 140 is in direct contact with an upper surface of the base 150.

The filter unit 140 may function to block light of a specific frequency band from light passing through the lens 110 accommodated in the lens 110.

For example, the filter unit 140 may block light of a specific frequency band from entering the sensor 180. For example, the filter unit 140 may be an infrared filter. However, the embodiment is not limited thereto. For example, depending on characteristics of the camera module, the filter unit 140 may include a filter other than an infrared filter.

The filter unit 140 may be disposed to be parallel to a direction perpendicular to the optical axis (e.g., a width direction or a length direction or an x-y plane direction).

A circuit board 160 may be disposed under the base 150. For example, the base 150 integrated with the filter unit 140 may be attached to or coupled to the circuit board 160.

To this end, an adhesive part 145 may be disposed between the base 150 and the circuit board 160.

The adhesive part 145 may be disposed between an upper surface of the circuit board 160 and a lower surface of the base 150. The adhesive part 145 may be in direct contact with an ultraviolet curable material constituting the base 150. In this case, the base 150 is a portion that has already been cured in a manufacturing process of the filter module. Accordingly, deformation of the base 150 does not occur in a process of attaching the base 150 using the adhesive part 145.

The adhesive part 145 allows the base 150 integrated with the filter unit 140 to be stably disposed or coupled to the circuit board 160. For example, the adhesive part 145 may fix the base 150 on the circuit board 160.

Meanwhile, the circuit board 160 may include a cavity C vertically or optically overlapping the opening of the base 150.

In this case, the cavity C may mean a through hole penetrating the circuit board 160. For example, the circuit board 160 includes at least one insulating layer. And, the cavity C may penetrate from an upper surface of an insulating layer disposed at an uppermost side of the circuit board 160 to a lower surface of an insulating layer disposed at a lowermost side of the circuit board 160. Accordingly, the circuit board 160 may include a hollow corresponding to the cavity C. In this case, the cavity C may function as an arrangement space in which the sensor 180 of the embodiment is disposed. For example, the sensor 180 may be disposed in the cavity C. In this case, the sensor 180 may be spaced apart from an inner wall of the cavity C. Accordingly, the sensor 180 may not be in direct contact with the circuit board 160.

In this case, the cavity C of the circuit board 160 may overlap the lens 110 of the embodiment in an optical axis. For example, the cavity C of the circuit board 160 may overlap the filter unit 140 in an optical axis. For example, the cavity C of the circuit board 160 may overlap the sensor 180 in an optical axis. In this case, a size of the cavity C may be larger than a size of the sensor 180. Also, the size of the cavity C may be larger than a size of the filter unit 140 or a size of the lens 110, or may be smaller than a size of the lens 110.

The camera module 100 according to an embodiment includes a sensor 180. The sensor 180 may also be referred to as an image sensor. For example, the sensor 180 may refer to a sensor that acquires an image using light passing through the lens 110 and the filter unit 140 according to an embodiment. The sensor 180 may overlap the cavity C formed in the circuit board 160 according to an embodiment in an optical axis. For example, the sensor 180 may be disposed in the cavity C formed in the circuit board 160.

The camera module 100 according to an embodiment may include a reinforcement plate 170.

The reinforcement plate 170 may be attached to a lower surface of the circuit board 160.

The reinforcement plate 170 may include an overlapping region that overlaps the cavity C of the circuit board 160 in an optical axis.

In addition, the sensor 180 may be attached to an upper surface of the overlapping region of the reinforcement plate 170. For example, the sensor 180 may be attached to an upper surface of the overlapping region of the reinforcement plate 170 while being disposed in the cavity C of the circuit board 160.

That is, in recent years, a resolution required by the camera module is increasing. In addition, as the resolution increases, a size of the sensor 180 is increasing. In this case, when the sensor 180 is disposed on the circuit board 160, it may be difficult to maintain the flatness of the sensor 180 that gradually increases in size. Also, when the sensor 180 is disposed on the circuit board 160, heat dissipation characteristics of the sensor 180 may be deteriorated.

Accordingly, in an embodiment, the reinforcement plate 170 is attached to a lower surface of the circuit board 160. In addition, in an embodiment, the sensor 180 may be attached on the reinforcement plate 170 instead of the circuit board 160.

For example, the sensor 180 of the embodiment may be directly attached on the reinforcement plate 170. Here, the direct attachment may mean that the sensor 180 is directly disposed on an adhesive part (described later) disposed on the reinforcement plate 170.

Meanwhile, while the sensor 180 is disposed on the reinforcement plate 170, the sensor 180 may be exposed through the cavity C of the circuit board 160. In addition, a terminal 181 of the sensor 180 may be electrically connected to a pad 162 of the circuit board 160. For example, the sensor 180 may be electrically connected to the circuit board 160 through a connection member W (e.g., a wire).

The reinforcement plate 170 may be a plate-shaped member having a thickness and hardness of a predetermined level or higher. Accordingly, the reinforcement plate 170 may stably support the sensor 180. In addition, the reinforcement plate 170 may inhibit the sensor 180 from being damaged by an external impact. For example, the reinforcement plate 170 may protect the sensor 180 from an external impact. In addition, the reinforcement plate 170 may dissipate heat generated by the sensor 180. Accordingly, the reinforcement plate 170 may perform a heat dissipation function of dissipating heat generated by the sensor 180 to an outside, while improving the flatness of the sensor 180.

To this end, the reinforcement plate 170 may include a metal material having high thermal conductivity. For example, the reinforcement plate 170 may be SUS. However, the embodiment is not limited thereto. The reinforcement plate 170 may be formed of aluminum having high thermal conductivity other than SUS. In addition, as another example, the reinforcement plate 170 may include glass, plastic, or synthetic resin.

The reinforcement plate 170 may be connected to a ground (not shown) of the circuit board 160. For example, the reinforcement plate 170 may be electrically connected to a ground pattern (not shown) of the circuit board 160. Accordingly, the reinforcement plate 170 may serve as a ground for protecting the camera module from an electrostatic discharge protection (ESD).

For example, the circuit board 160 may include ground patterns (not shown) disposed on upper and lower surfaces of the insulating layer 161, respectively.

In addition, the reinforcement plate 170 may be connected to a ground pattern disposed on a lower surface of the insulating layer 161. In addition, the base 150 may be connected to a ground pattern disposed on an upper surface of the insulating layer 161. Through this, the embodiment can further improve the heat dissipation characteristics of the camera module. Specifically, the adhesive part 145 may be disposed on the ground pattern of the circuit board 160. Accordingly, the base 150 of an embodiment may be attached to the circuit board 160 through the adhesive part 145 disposed on the ground pattern.

Light passing through the filter unit 140 may be incident on the sensor 180. The sensor 180 may be a portion in which an image included in light incident through the filter unit 140 is formed.

The circuit board 160 may convert an image formed on the sensor 180 into an electrical signal and transmit the electrical signal to an external device. To this end, the circuit board 160 may include various circuit parts, element parts, control parts, etc. In addition, the circuit board 160 may include an element part or a pattern part electrically connected to the sensor 180. The pattern part may include the pad 162 and a ground pattern. A detailed configuration of the circuit board 160 is to be described below.

Meanwhile, the sensor 180 may receive an image included in incident light and convert the received image into an electrical signal. For example, the sensor 180 may be a charge-coupled device (CCD), a complementary metal-oxide semiconductor (CMOS), etc. However, embodiments are not limited thereto, and the sensor 180 may be implemented by other devices performing a function similar to that of the CCD or CMOS.

The filter unit 140 and the sensor 180 may face each other in an optical axis OA direction.

Meanwhile, the filter unit 140 may include a filter 141 having a blocking member 142 formed on an upper surface thereof. The blocking member 142 may be replaced with a "masking unit".

The blocking member 142 may be disposed at an edge region of an upper surface of the filter 141. The blocking member 142 may block a portion of light passing through the lens 110. For example, the blocking member 142 may block light incident to an edge region of the upper surface of the filter 141, among light passing through the lens 110. For example, the blocking member 142 can block light passing through the lens (110) from passing through the edge region of the upper surface of the filter 141. The blocking member 142 may be coupled or attached to the upper surface of the filter 141.

For example, the filter 141 may have a rectangular planar shape. In addition, the blocking member 142 may be formed symmetrically with the filter 141 along each side of the upper surface of the filter 141. The blocking member 142 may be formed to have a predetermined width at an edge region of the upper surface of the filter 141.

The blocking member 142 may be formed of an opaque material. For example, the blocking member 142 may be an adhesive material of an opaque material applied to the filter 141, but is not limited thereto. For example, the blocking member 142 may be a film of an opaque material attached to the upper surface of the filter unit 140.

The filter 141 and the sensor 180 may be disposed to face each other in an optical axis direction. In addition, the blocking member 142 may include at least a portion overlapping the pad 162 and/or the connection member W disposed on the circuit board 160 in an optical axis direction.

Meanwhile, the connection member W and the pad 162 may be formed of a conductive material. For example, the connection member W and the pad 162 may be formed of gold (Au), silver (Ag), copper (Cu), a copper alloy, or the like. Meanwhile, a conductive material constituting the connection member W and the pad 162 has a characteristic of reflecting light. Accordingly, light passing through the filter 141 may be reflected by the pad 162 and/or the connection member W of the circuit board 160. In addition, an instantaneous flare phenomenon may occur due to the reflected light. In addition, the flare phenomenon may distort an image formed by the sensor 180 or deteriorate image quality thereof.

In this case, a portion of the blocking member 142 of the filter unit 140 overlaps the pad 162 and/or the connection member W in the optical axis direction. Thereby, light directed to the pad 162 and/or the connection member W of the circuit board 160 among the light passing through the lens 110 may be blocked. In the embodiment, a flare phenomenon may be inhibited by blocking the light. Accordingly, an embodiment may inhibit an image formed by the sensor 180 from being distorted. Furthermore, an embodiment may improve a quality of an image obtained by the sensor 180.

The circuit board 160 may be electrically connected to the lens driving device 130. For example, the circuit board 160 may be electrically connected to the driving board of the lens driving device 130.

For example, the circuit board 160 may supply a driving signal to the first and second coils of the lens driving device 130. Furthermore, the circuit board 160 may supply a driving signal to an AF position sensor (or an OIS position sensor). Furthermore, the circuit board 160 may receive an output signal of an AF position sensor (or an OIS position sensor).

Meanwhile, the camera module 100 includes a connector 190.

The connector 190 may be disposed on the circuit board 160. For example, the connector 190 may be electrically connected to the circuit board 160. The connector 190 may include a port electrically connected to an external device.

Meanwhile, the camera module 100 of an embodiment may include a plurality of adhesive parts disposed between different components. The adhesive part may provide an adhesive force between different components. For example, the adhesive part may attach or fix one component to or to another component.

For example, the camera module 100 may include an adhesive part 175 disposed between a lower surface of the sensor 180 and an upper surface of the reinforcement plate 170. The sensor 180 may be attached or fixed to the reinforcement plate 170 by the adhesive part 175.

The reinforcement plate 170 may be divided into a plurality of regions.

The reinforcement plate 170 may include a first region and a second region. The first region of the reinforcement plate 170 may be a region overlapping the cavity C of the sensor 180 and/or the circuit board 160 in the optical axis direction.

The second region of the reinforcement plate 170 may be a region that does not overlap the sensor 180 and the cavity C in the optical axis direction.

In addition, the adhesive part 175 may be disposed on the first region of the reinforcement plate 170. That is, the first region of the reinforcement plate 170 may be a sensor attachment region to which the sensor 180 is attached by the adhesive part 175. The adhesive part 175 may be any one of an epoxy, a thermosetting adhesive, an ultraviolet curable adhesive, and an adhesive film, but is not limited thereto.

Meanwhile, the adhesive part 165 may be disposed on the second region of the reinforcement plate 170. The adhesive part 165 may attach or fix the reinforcement plate 170 to the circuit board 160. An area of the adhesive part 165 may correspond to an area of the circuit board 160.

Meanwhile, the circuit board 160 includes an insulating layer 161.

In addition, the circuit board 160 includes a circuit pattern part disposed on an insulating layer. The circuit pattern part may include a pad 162 electrically connected to the sensor 180 through a connection member W. In this case, although the drawing shows that only the pad electrically connected to the sensor 180 is disposed on the insulating layer 161, the embodiment is not limited thereto.

In addition, the circuit board includes a protective layer 163 disposed on the insulating layer 161. The protective layer 163 may be disposed on not only an upper surface of the insulating layer 161 but also an upper surface of the circuit pattern part. The protective layer 163 may function to protect an upper surface of the insulating layer 161 and an upper surface of the circuit pattern part.

The protective layer 163 may include an open region vertically overlapping an upper surface of the pad 162 electrically connected to the sensor 180 among the pattern parts. In addition, the pad 162 may be exposed through the open region of the protective layer 163. Accordingly, an embodiment may electrically connect the upper surface of the exposed pad 162 and the terminal 181 of the sensor 180 through the connection member W.

Meanwhile, in the embodiment, the pad 162 of the circuit board 160 and the terminal 181 of the sensor 180 are electrically connected through the connection member W.

An upper surface of the sensor 180 or an upper surface of the terminal 181 is positioned lower than an upper surface of the circuit board 160. In addition, an uppermost end of the connection member W is positioned higher than an upper surface of the circuit board 160. For example, an uppermost end of the connection member W is positioned higher than an upper surface of the protective layer 163.

Preferably, the connection member W may be positioned higher than the upper surface of the circuit board 160 by a predetermined protrusion height t1.

Accordingly, the base 150 of an embodiment provides a seating part for seating the filter unit 140 in a state in which the base 150 is spaced apart by the protrusion height t1 of the connection member W. That is, a minimum thickness of the base 150 may be greater than the protrusion height t1. However, the adhesive part 145 is disposed between the base 150 and the circuit board. Accordingly, in consideration of a thickness of the adhesive part 145, a minimum thickness of the base 150 may correspond to the protrusion height t1. Accordingly, the embodiment can allow an uppermost end of the connection member W and the filter 141 to be spaced apart by a certain distance along the optical axis by the base 150.

Meanwhile, the embodiment can be screw-less connected to the lens barrel 120 and the bobbin 132 of the lens driving device 130. That is, the embodiment uses a screw-less connection method that can minimize the error range of optical axis alignment as a high-performance camera module is required to connect the lens barrel 120 and the bobbin 132.

The screw-less connection method can mean a method of fixing the lens barrel 120 to the bobbin 132 using an adhesive part 190 while inserting the lens barrel 120 into a hollow portion of the bobbin 132 from an upper or lower side.

That is, the adhesive part 190 may be disposed between an inner surface of the bobbin 132 and an outer surface of the lens barrel 120. The adhesive part 190 may firmly fix the lens barrel 120 to the bobbin 132. The adhesive part 190 may include a thermosetting epoxy or a UV epoxy. When the adhesive part 190 is implemented with a thermosetting epoxy, the adhesive part 190 may be cured in an oven, and unlike this, the adhesive part 190 may be cured by directly applying heat to the adhesive part 190. Also, when the adhesive part 190 is implemented with a UV epoxy, an embodiment may cure the adhesive part 190 by applying ultraviolet rays.

In addition, the adhesive part 190 may be implemented with an epoxy in which thermal curing and ultraviolet curing are mixed. For example, the adhesive part 190 may be an epoxy capable of both thermal curing and ultraviolet curing. Meanwhile, the adhesive part 190 of the embodiment is not limited to an epoxy, and any adhesive material capable of fixing the lens barrel 120 to the bobbin 132 may be replaceable.

Hereinafter, the filter module will be described in more detail with reference to FIGS. 5 to 9.

The filter module according to an embodiment may include a base 150 integrated with the filter unit 140.

The filter module may include a base 150, a filter 141 attached to the base 150, and a blocking member 142 attached to the filter unit 140.

The filter 141 may include an upper surface facing the lens 110 and a lower surface facing the sensor 180.

The blocking member 142 may be disposed on an upper surface of the filter 141. The blocking member 142 may be partially disposed on the upper surface of the filter 141. Preferably, the blocking member 142 may be selectively disposed in an edge region of the upper surface of the filter 141. For example, the blocking member 142 may include an opening (not shown) that opens a center region of the upper surface of the filter 141. For example, the blocking member 142 may open a region of the upper surface of the filter 141 overlapping the sensor 180 in an optical axis. The blocking member 142 may be attached to or coupled to the upper surface of the filter 141. The blocking member 142 may be formed by applying an opaque material to the upper surface of the filter 141. The blocking member 142 may be formed by attaching an opaque film to the upper surface of the filter 141.

A base 150 having a predetermined thickness is disposed on the lower surface of the filter 141. For example, the base 150 may be referred to as a protrusion part protruding from the lower surface of the filter 141 toward the sensor 180. In addition, the base 150 may be referred to as a seating part for stably seating the filter 141.

At this time, before explaining numerical characteristics of the base of the present application, specific numerical characteristics of the base of the prior art will be described.

The base of the prior art is an injection product manufactured using a resin. That is, the base of the prior art includes only an insulating material such as a resin. In this case, the base of the prior art includes a seating part such as a window in which the filter unit is seated, a first protrusion part protruding downward from a lower surface of the seating part, and a second protrusion part protruding upward from an upper surface of the seating part. The first protrusion part of the base of the prior art separates the seating part of the base from the circuit board at a predetermined interval. For example, a connection member (wire) electrically connecting the sensor and the circuit board protrudes from the upper surface of the circuit board by a predetermined protrusion height (t1) toward the lens 110. Accordingly, the first protrusion part is formed to have a predetermined thickness so that the filter unit seated on the seating part does not contact the connection member. In this case, the protrusion height (t1) exceeds 150 μm. For example, the protrusion height (t1) exceeds 170 μm. Accordingly, a thickness of the first protrusion part of the base of the prior art exceeds 150 μm. For example, the thickness of the first protrusion part of the base of the prior art exceeds 170 μm.

Meanwhile, the seating part of the base of the prior art has a predetermined thickness. In this case, the thickness of the seating part may be determined by the size of the filter. The thickness of the seating part of the prior art is about 180 μm. In recent years, the size of a sensor is increasing, and accordingly, a size of a filter is also increasing. In addition, when the thickness of the seating part above must be 180 μm or more, a large-sized filter can be stably seated. For example, when the thickness of the seating part above must be 180 μm or more, the flatness of the filter can be maintained (or warpage properties are improved). This is because the base of the prior art is an injection product of an insulating material, and accordingly, the seating part is also an injection product formed of an insulating material. In addition, if the thickness of the seating part of the prior art is less than 180 μm, injection defects such as unmolding of the seating part may occur in a process of manufacturing the base by injection. In addition, if the thickness of the seating part of the prior art is less than 180 μm, injection defects in which burrs occur during injection may occur in a process of manufacturing the base by injection. Accordingly, the seating part of the prior art has a thickness of at least 180 μm.

Meanwhile, the second protrusion of the base of the prior art has a predetermined thickness. The thickness of the second protrusion part is determined by the injection property of the base manufactured by injection. For example, if a total thickness of the base including the second protrusion part becomes thin, extractability may deteriorate in a process of extracting the injection product from an injection mold. For example, if a total thickness of the base including the second protrusion part becomes thin, deformation may occur in a process of extracting the injection product from the injection mold. Accordingly, the total thickness of the base of the prior art is 720 μm. For example, if the total thickness of the base is less than 720 μm, injection defects such as decrease in extractability and deformation may occur.

As described above, in the prior art, the base is manufactured using only an insulating material such as a resin. Accordingly, there is a limit to reducing the total thickness of the base because injection defects must be considered in the prior art. Furthermore, by using the base injected with the insulating material, it may not be possible to stably seat the filter unit that is becoming larger. For example, in the prior art, there is a limit to increasing a width of the base in response to the increase in a size of the sensor and filter unit.

Meanwhile, in the prior art, the FBL corresponding to an optical axis distance between the sensor and the lens is increasing due to a thickness of each portion of the base as described above. For example, in the prior art, the FBL (Flange Back Length) has a minimum level of 1.1 due to limits of a minimum thickness of each of the first protrusion part, the seating part, and the second protrusion part.

In this case, since the thickness of the first protrusion part in the prior art is determined by the protrusion height (t1) of the connection member, it may be difficult to reduce it. However, a thickness of the seating part and a thickness of the second protrusion part (e.g., a total thickness of the base) may be reduced under conditions of improving injection defects or improving the bending characteristics of the filter.

Accordingly, in an embodiment, by providing the base 150 integrated with the filter unit 140, the base 150 may have a structure including only the first protrusion part of the base in the prior art. Accordingly, the embodiment may significantly reduce a total thickness of the filter unit 140 compared to the prior art. Accordingly, the embodiment may reduce the FBL of the camera module.

In other words, the embodiment does not manufacture a base separate from the filter unit as in the prior art by an injection process, but manufactures a base 150 integrated with the filter unit 140.

A process of manufacturing the filter module of the embodiment will be briefly described as follows.

For manufacturing the filter module, a mold core (not shown) may be first prepared. In this case, a recess (not shown) may be formed in a region corresponding to the base 150 in the mold core.

The recess may have a rectangular frame shape that is concave from an upper surface toward a lower surface of the mold core. In addition, an outer width of the recess may be determined based on an outer width of the filter 141. For example, an outer width of the recess may be smaller than an outer width of the filter 141.

Next, the embodiment may proceed with a process of applying a curable material in the recess of the mold core. For example, the embodiment may proceed with a process of filling the recess of the mold core with an ultraviolet paint. For example, the embodiment may proceed with a process of filling the recess of the mold core with an epoxy that can be cured by ultraviolet rays.

Next, the embodiment may proceed with a process of disposing the filter 141 on the mold core. In this case, the filter 141 disposed on the mold core may be a filter fabric. In general, the filter fabric is composed of a polyethylene terephthalate (PET) film sheet.

Accordingly, the embodiment may proceed with a process of applying the polyester film sheet of the filter 141 onto a recess filled with an ultraviolet curable material.

Thereafter, the embodiment proceed with a process of curing the ultraviolet curable material filled in the recess by irradiating ultraviolet rays while the polyester film sheet is coated. In this case, the ultraviolet irradiation may be performed on the polyester film sheet. That is, the polyester film sheet is a film made of a transparent material through which ultraviolet rays may transmit. Accordingly, when the ultraviolet irradiation is performed, the irradiated ultraviolet rays may pass through the polyester film sheet and be transferred to the ultraviolet curable material disposed in the recess.

In addition, the ultraviolet curable material filled in the recess may be cured by the irradiated ultraviolet rays. Specifically, the ultraviolet curable material may be cured in a state of being attached to a polyester film sheet disposed on the mold core.

Next, in an embodiment, after curing the ultraviolet curable material, a black masking process may be performed on the polyester film sheet. The black masking process may include a process of applying a light blocking material (for example, an adhesive material of an opaque material) onto the polyester film sheet, but is not limited thereto. For example, the black masking process may be a process of attaching a film of an opaque material onto the polyester film sheet.

Next, as the black masking process is completed as described above, the embodiment may proceed with a process of cutting the polyester film sheet. For example, the polyester film sheet may be larger than the size of the filter 141 actually applied. Accordingly, the embodiment may proceed with a process of cutting the polyester film sheet according to the size of the filter 141 to be actually applied.

In addition, as the cutting process as described above is completed, a filter module according to the embodiment can be manufactured.

That is, the filter module may include a base 150 and a blocking member 142 integrated with the filter 141 which is the polyester film sheet. In addition, the base 150 may have a rectangular frame shape including an opening 151 opening a center region of a lower surface of the filter 141.

Meanwhile, the base 150 may have a predetermined thickness.

The thickness of the base 150 may be greater than the protrusion height t1 of the connection member W. For example, a minimum thickness of the base 150 may correspond to the protrusion height t1 of the connection member W.

The base 150 may allow the filter 141 to be spaced apart from an uppermost end of the connection member W in an upward direction while seating the filter 141. A thickness T1 of the base 150 may satisfy a range of 150 μm to 450 μm. Preferably, the thickness T1 of the base 150 may satisfy a range of 200 μm to 400 μm. More preferably, the thickness T1 of the base 150 may satisfy a range of 250 μm to 350 μm.

In this case, if the thickness T1 of the base 150 is less than 150 μm, a physical or electrical reliability problem may occur in an operating environment of the camera module.

If the thickness T1 of the base 150 is less than 150 μm, a problem in which the filter 141 contacts the connection member W may occur. In addition, when the filter 141 contacts the connection member W, an electrical disconnection between the sensor 180 and the circuit board 160 may occur.

In addition, if the thickness T1 of the base above (150) is less than 150 μm, the flatness of the filter 141 may decrease, resulting in a problem of reducing the bending characteristics.

In addition, if the thickness T1 of the base 150 is less than 150 μm, a reliability problem in a process of curing the UV curable material may occur. For example, if the thickness T1 of the base 150 is less than 150 μm, an open problem in which a specific region is not filled with the curable material may occur in a process of curing the UV curable material.

If the thickness T1 of the base 150 exceeds 450 μm, a thickness of the filter module may be increased. In addition, when the thickness of the filter module increases, a flange back length (FBL) of the camera module may increase. In addition, the thickness of the camera module may increase as the thickness of the filter module increases.

A thickness T2 of the filter 141 disposed on the base 150 may be in a range of 100 μm to 140 μm. In addition, the FBL of the embodiment can reflect the thickness T2 of the filter 140 in the thickness T1 of the base 150.

Meanwhile, the base 150 may have a predetermined width W1 on the lower surface of the filter 141. For example, the width W1 of the base 150 may range from 350 μm to 700 μm. If the width W1 of the base 150 is less than 350 μm, an open problem may occur in a process of manufacturing the base 150. In addition, if the width of the base 150 is less than 350 μm, the flatness of the filter 141 may be deteriorated.

If the width W1 of the base 150 exceeds 700 μm, an area of the base 150 may be increased correspondingly. In addition, as the area of the base 150 increases, an area of the filter 141 may also increase. Accordingly, the area or volume of the camera module may increase.

Meanwhile, the base 150 may be spaced apart inward from an edge of the lower surface of the filter 141.

For example, the base 150 may be disposed within the filter 141 by a second width W2 from an outermost end of the lower surface. For example, the outer surface of the base 150 may be spaced apart from an outer surface of the filter adjacent thereto by a second width W2.

In this case, the second width W2 may satisfy a range of 30 μm to 100 μm. Preferably, the second width W2 may satisfy a range of 35 μm to 90 μm. More preferably, the second width W2 may satisfy a range of 40 μm to 70 μm.

If the second width W2 is less than 30 μm, a part of the ultraviolet curable material constituting the base 150 may overflow to a side surface or an upper surface of the filter 141.

In addition, if the second width W2 is less than 30 μm, the flatness of the filter 141 may be deteriorated. For example, if the second width W2 is less than 30 μm, a problem in which the flatness of an inner (or center) region of the filter 141 is deteriorated compared to an outer region may occur. In addition, to solve this problem, a problem in which the width W1 of the base 150 needs to be further increased may occur.

If the second width W2 is greater than 100 μm, a problem in which an outer region of the filter 141 is damaged by an external impact may occur. Also, if the second width W2 is greater than 100 μm, an area of the filter 141 which is meaninglessly wasted may increase. As a result, a problem in that a manufacturing cost increases or a volume of the camera module increases may occur.

As described above, a thickness of the base 150 of the embodiment may be smaller than a thickness of the base of the prior art. That is, the thickness T1 of the base 150 of the embodiment is 150 μm to 450 μm. In addition, the thickness of the base of the prior art was about 720 μm. Accordingly, the embodiment may be reduced to a level of 20% to 63% of the thickness of the base compared to the prior art. Accordingly, the embodiment may lower the flange back length (FBL) compared to the prior art. Furthermore, the embodiment may reduce a total thickness or volume of the camera module.

Specifically, when the base 150 integrated with the filter 141 and coupled using the ultraviolet curable material of the embodiment is applied, the flange back length (FBL) may be lowered to a level of 0.84.

Figure 10:
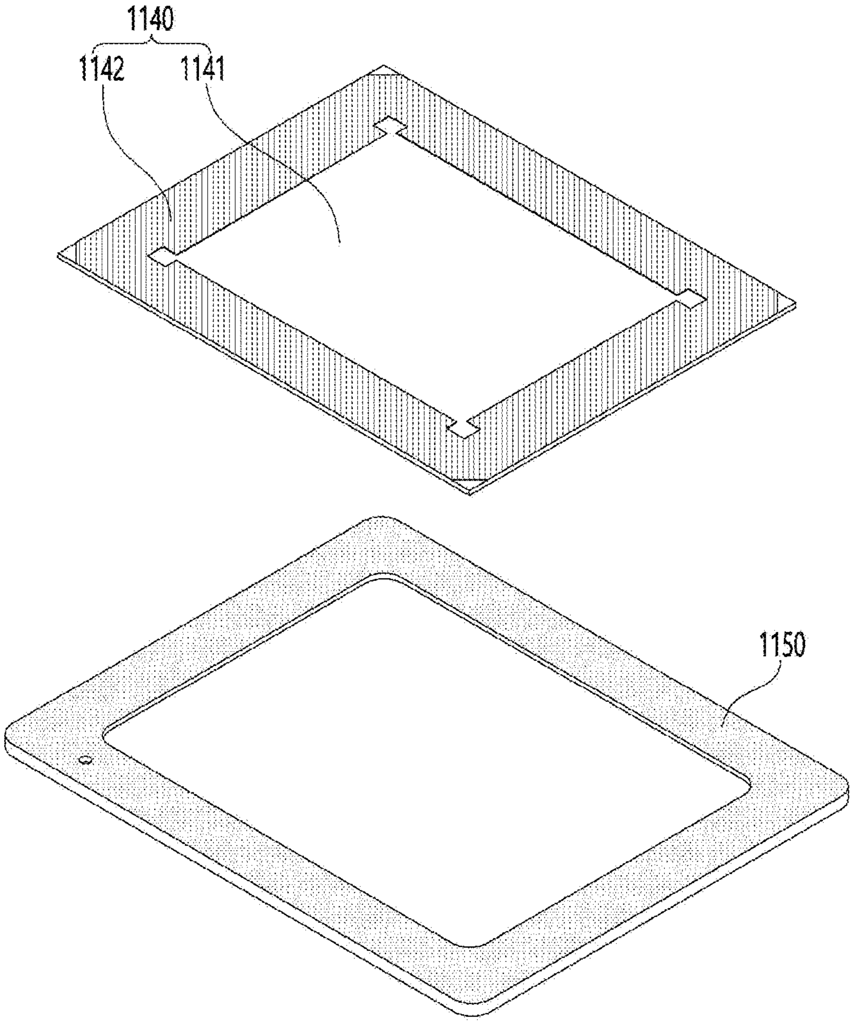
FIG. 10 is an exploded perspective view of a filter module according to a second embodiment.
Figure 11A:
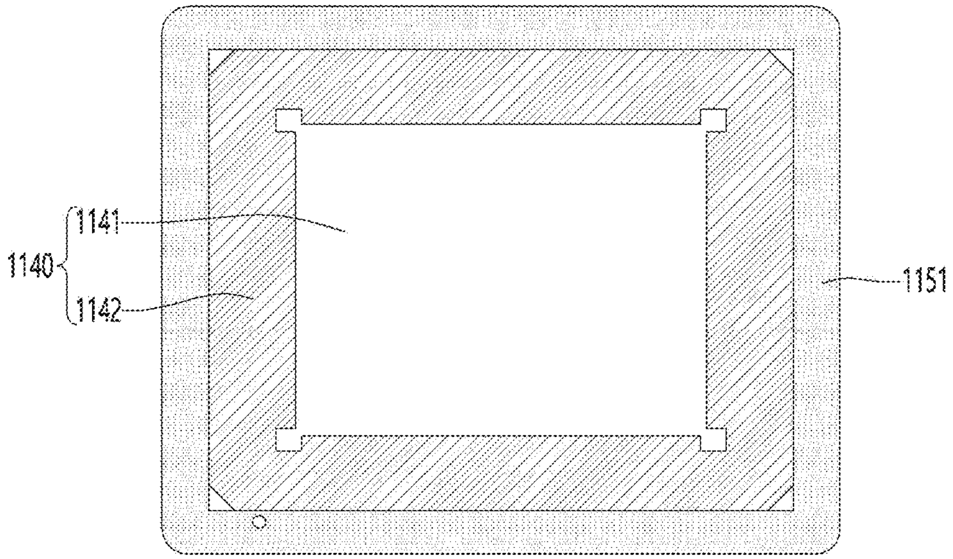
FIGS. 11(*a*) and 11(*b*) are plan views of a filter module according to a second embodiment.
Figure 11B:
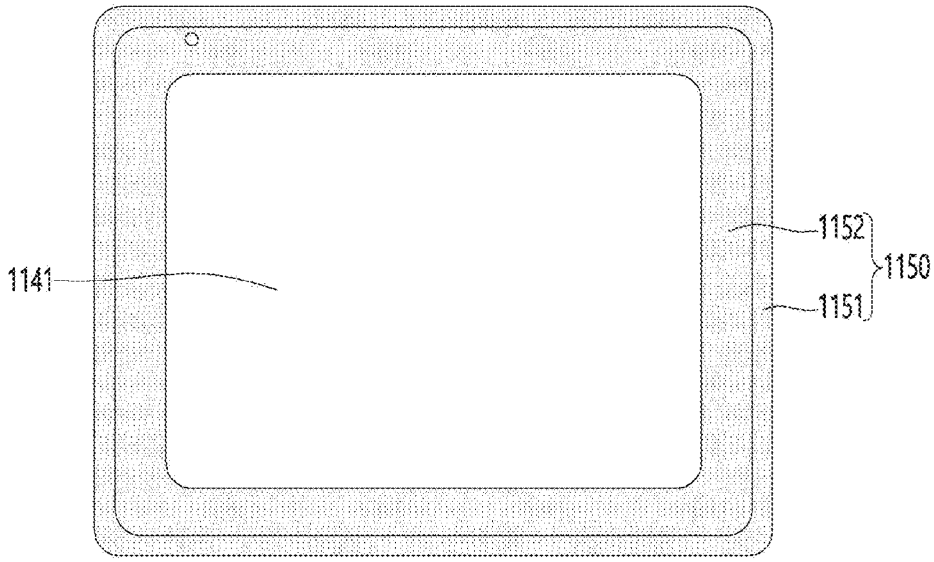
Figure 12A:
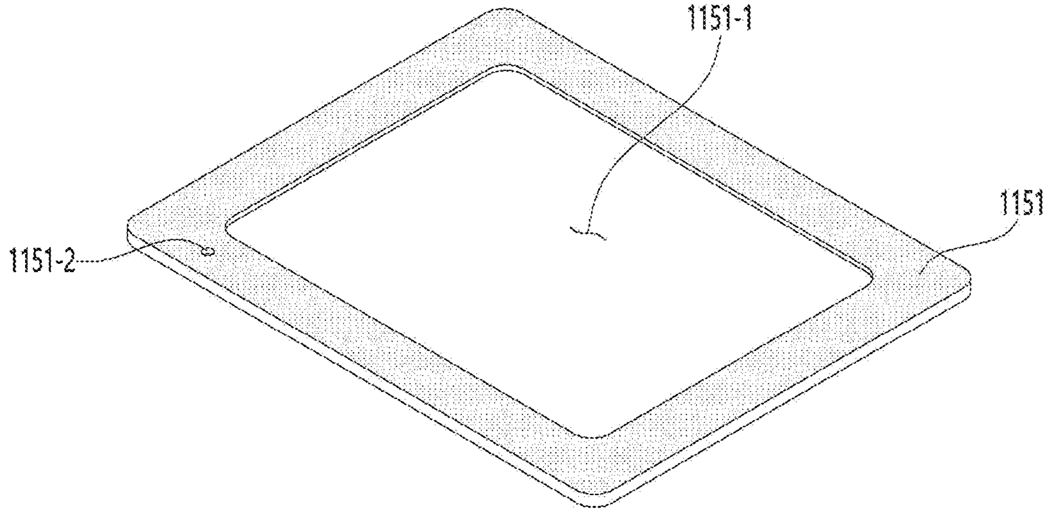
FIGS. 12(*a*) and 12(*b*) are perspective views of a base according to a second embodiment.
Figure 12B:
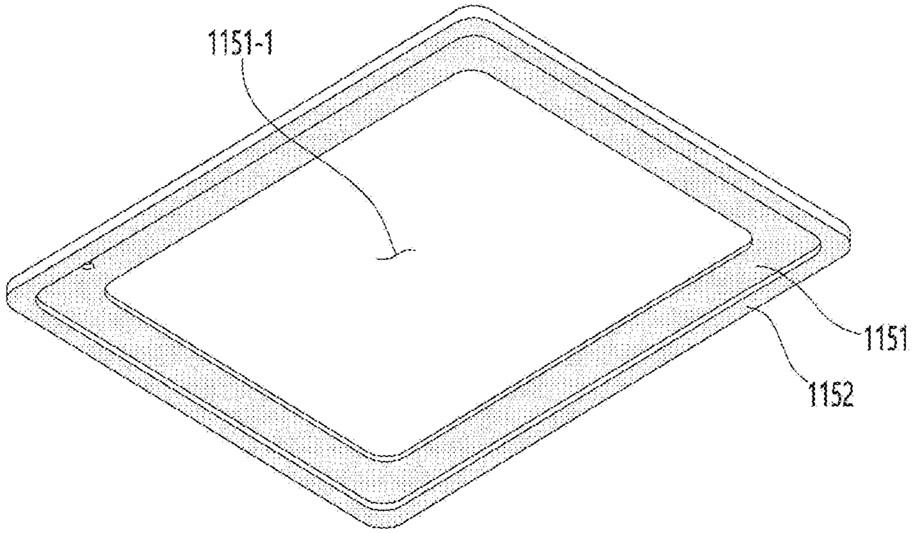
Figure 13:
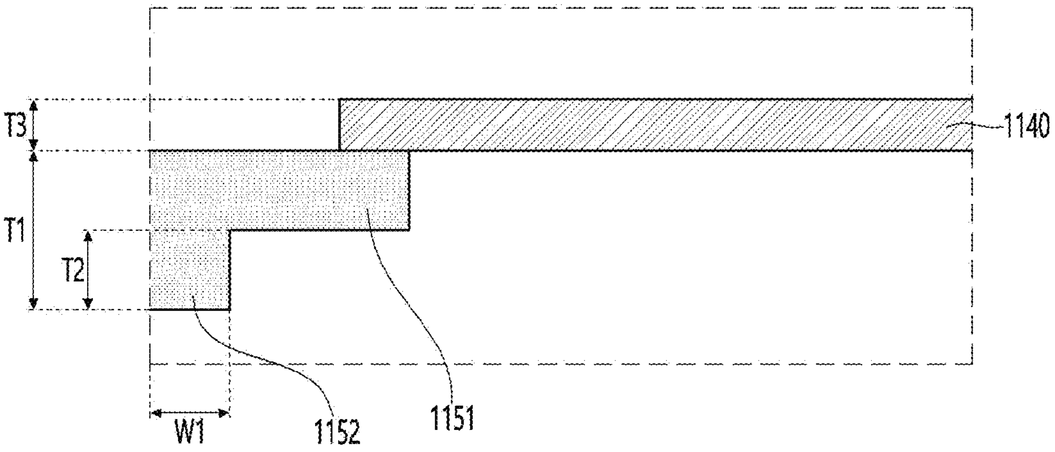
FIG. 13 is a cross-sectional view of a filter module according to a second embodiment taken along a direction A-A'.
Figure 14:
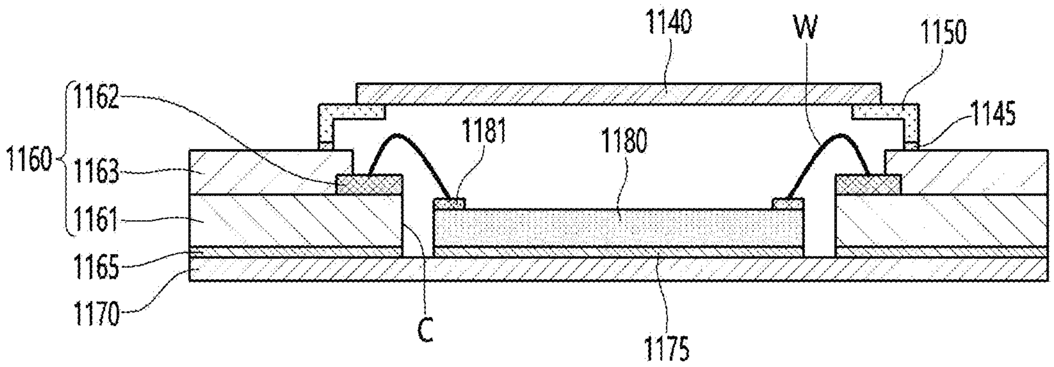
FIG. 14 is a coupling view of a filter module and a circuit board according to a second embodiment.
Figure 15A:
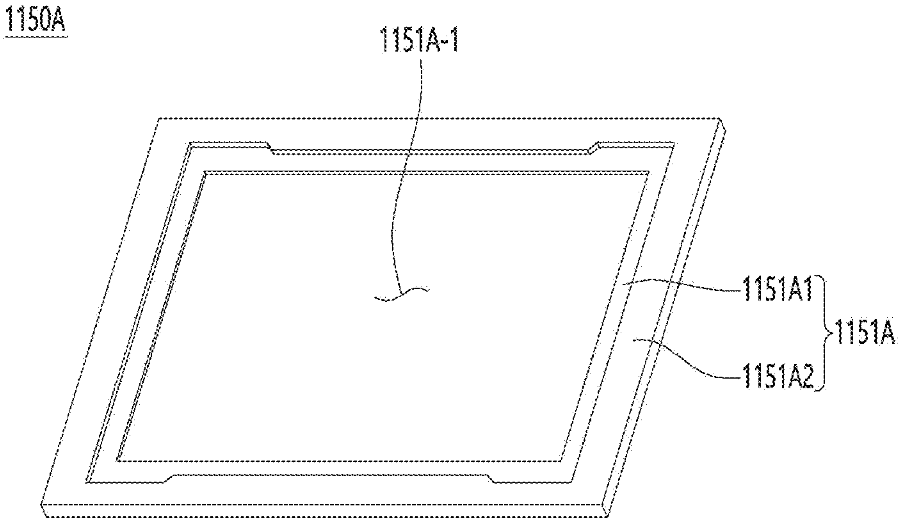
FIGS. 15(*a*) and 15(*b*) are perspective views of a base according to a third embodiment.
Figure 15B:
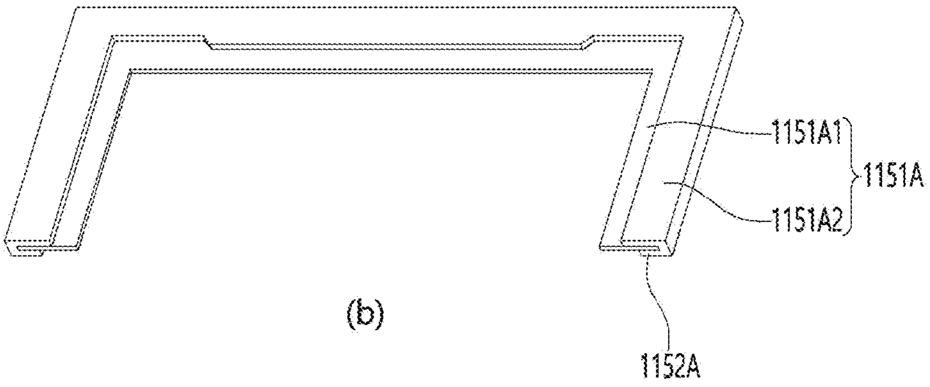

FIG. 10 is an exploded perspective view of a filter module according to a second embodiment, FIGS. 11(*a*) and 11(*b*) are plan views of a filter module according to a second embodiment, FIGS. 12(*a*) and 12(*b*) are perspective views of a base according to a second embodiment, FIG. 13 is a cross-sectional view of a filter module according to a second embodiment taken along a direction A-A', FIG. 14 is a coupling view of a filter module and a circuit board according to a second embodiment, and FIGS. 15(*a*) and 15(*b*) are perspective views of a base according to a third embodiment.

Referring to FIGS. 10 to 15(*b*), a camera module of the second embodiment may have a different structure of a filter module compared to the camera module of the first embodiment. Hereinafter, a structure of the filter module equipped in the camera module of the second embodiment and other components connected thereto will be described. That is, in the description of the camera module of the second embodiment below, a detailed description of a component having substantially the same structure as that of the first embodiment will be omitted.

A base 1150 of the camera module according to the second embodiment may be disposed under the lens driving device, and a filter unit 1140 may be mounted on the base 1150. To this end, the base 1150 may include a seating part in which the filter unit 1140 is seated. That is, the base 1150 may include a window in which a region in which the filter unit 1140 is disposed is opened. Accordingly, the seating part of the base 1150 may also be referred to as a window. The filter unit 1140 and the base 1150 may be referred to as a filter module.

The filter unit 1140 may be mounted on the base 1150. To this end, the base 1150 may include a frame part 1151 on which the filter unit 1140 is mounted.

The base 1150 according to an embodiment may be manufactured by any one of a metal press method, a die casting method, and a metal insert mold (MIM) method. The base 1150 may also be referred to as a metal frame including a metal material. In this case, the base 1150 may have different shapes depending on a manufacturing method.

The base 1150 may include a frame part 1151 on which the filter unit 1140 is mounted, and a protrusion part 1152 protruding downward from a lower surface of the frame part 1151. In addition, the frame part 1151 and the protrusion part 1152 may constitute a metal frame integrally formed of a metal material.

In an embodiment, the base 1150 on which the filter unit 1140 is mounted is formed of a metallic material. Accordingly, an embodiment may improve the rigidity of the base 1150. Furthermore, an embodiment may improve the flatness of the filter unit 1140 mounted on the base 1150.

In an embodiment, since the frame part 1151 of the base 1150 is formed of a metallic material, a thickness of the frame part 1151 may be minimized. For example, in a case where the base is an injection-molded product made of an insulating material as in comparative example, a seating part corresponding to the frame part 1151 should have a thickness of at least 180 μm for mounting and/or supporting the filter unit 1140. In contrast, in an embodiment, the frame part 1151 is a part of the base 1150, which is a metal frame, and thus may have a thickness smaller than 180 μm. Accordingly, an embodiment may reduce a thickness of the frame part 1151 of the base 1150. Further, in an embodiment, a thickness of the base 1150 may be reduced. Specifically, the thickness of the frame part 1151 and the base 1150, including the same, may be reduced while maintaining the flatness of the filter unit 1140. Also, in an embodiment, the FBL may be reduced by reducing the thickness of the base 1150.

Specifically, the base 1150 of the second embodiment may be manufactured by a first method. For example, the base 1150 of the second embodiment may be manufactured by a metal press method. Furthermore, the base 1150A of the third embodiment (FIGS. 15(*a*) and 15(*b*)) may be manufactured by a die casting method or an MIM method.

Therefore, the base may have different shapes according to the manufacturing method.

An upper surface of the frame part 1151 of the base 1150 of the second embodiment may be a flat surface. The upper surface of the frame part 1151 of the base 1150 of the second embodiment may not have a step difference. This is because it may be difficult to manufacture the frame part 1151 having a step difference by the metal press method. Alternatively, an upper surface of the frame part of the base 1150A of the third embodiment may have a step difference. A protrusion part protruding toward the lens may be included on the upper surface of the frame part of the base 1150A of the third embodiment. In addition, the protrusion part of the frame part of the third embodiment may be disposed surrounding the side surface of the filter unit 1140. Accordingly, it is possible to protect a side portion of the filter unit 1140 from external impact.

Specifically, the filter module of the second embodiment includes a filter unit 1140 and a base 1150 on which the filter unit 1140 is mounted. The filter unit 1140 includes a filter 1141 and a blocking member 1142 disposed on one surface of the filter 1141. The filter 1141 may include an upper surface facing the lens and a lower surface facing the sensor 1180.

The blocking member 1142 may be disposed on an upper surface of the filter 1141. The blocking member 1142 may be partially disposed on an upper surface of the filter 1141. Preferably, the blocking member 1142 may be selectively disposed at an edge region of the upper surface of the filter 1141. For example, the blocking member 1142 may include an opening (not shown) that opens a center region of the top surface of the filter 1141. For example, the blocking member 1142 may open a region of the upper surface of the filter 1141, which overlaps the sensor 1180 in an optical axis. The blocking member 1142 may be attached to or coupled to the upper surface of the filter 1141. The blocking member 1142 may be formed by applying an opaque material to the upper surface of the filter 1141. The blocking member 1142 may be formed by attaching an opaque film to the upper surface of the filter 1141.

The base 1150 is disposed under the filter unit 1140. The base 1150 includes a seating part on which the filter unit 1140 is disposed or seated.

In this case, the base 1150 is formed of a metal material. For example, the base 1150 is a metal frame formed of a metal material. Specifically, the base 1150 includes a frame part 1151 and a protrusion part 1152. The frame part 1151 may function as a seating part on which the filter unit 1140 is seated.

Accordingly, the flatness of the filter unit 1140 seated on the base 1150 may be maintained while securing the rigidity of the base 1150 by using the frame part 1151 of the metal material. To this end, the base 1150 may be formed of a metal material having a predetermined rigidity.

The frame part 1151 and the protrusion part 1152 of the base 1150 are not respectively manufactured through separate processes and then coupled, but are integrally manufactured by a metal press method.

Accordingly, the frame part 1151 of the base 1150 of the embodiment may function as a seating part of the base of the comparative example. That is, in the embodiment, the seating part on which the filter unit 1140 is seated is formed of a metallic material. Accordingly, the embodiment may reduce the thickness of the seating part compared to the comparative example. For example, the thickness of the frame part 1151 in the embodiment may be smaller than the thickness of the seating part in the comparative example. In addition, the embodiment can respond to an increase in the size of the filter by applying the frame part 1151.

The frame part 1151 may have a planar shape corresponding to a shape of the filter unit 1140. For example, a planar shape of the frame part 1151 may have a rectangular ring shape, but is not limited thereto. For example, the frame part 1151 may have a circular ring shape corresponding to a shape of the lens 110.

The protrusion part 1152 may protrude with a predetermined thickness in a downward direction from a lower surface of the frame part 1151. For example, the protrusion part 1152 may have a closed loop shape on a lower surface of the frame part 1151, and may have a protruding structure.

The protrusion part 1152 may also be a separation part for separating the frame part 1151 from the circuit board 1160 in an upward direction to correspond to the protrusion height t1 of the connection member W.

Also, the protrusion part 1152 may be referred to as an accommodation part or a pocket part in which the protrusion part of the connection member W is accommodated. Accordingly, a thickness of the protrusion part 1152 may correspond to the protrusion height t1 of the connection member W. For example, a thickness T2 of the protrusion part 1152 may satisfy a range of 150 μm to 250 μm. If the thickness T2 of the protrusion part 1152 is less than 150 μm, a physical or electrical reliability problem may occur in the operating environment of the camera module. For example, if the thickness T2 of the protrusion part 1152 is less than 150 μm, a problem may occur in that the filter unit 1140 disposed on the frame part 1151 contacts the connection member W. In addition, if the filter unit 1140 contacts the connection member W, an electrical disconnection may occur between the sensor 1180 and the circuit board 1160. Also, if the thickness T2 of the protrusion part 1152 is more than 250 μm, the total thickness T1 of the base 1150 may increase by the thickness of the protrusion part 1152. In addition, if a total thickness T1 of the base 1150 increases, the FBL (Flange Back Length) of the camera module according to the embodiment may increase.

Meanwhile, the protrusion part 1152 may have a predetermined width W1 on a lower surface of the frame part 1151. For example, the width W1 of the protrusion part 1152 may range from 350 μm to 700 μm. If the width W1 of the protrusion part 1152 is less than 350 μm, the rigidity of the base 1150 may be deteriorated. If the width W1 of the protrusion part 1152 is less than 350 μm, metal press processability may be deteriorated. For example, if the width W1 of the protrusion part 1152 is less than 350 μm, an open region in which at least a portion of the protrusion part 1152 is not formed may exist in the metal pressing process. If the width W1 of the protrusion part 1152 exceeds 700 μm, an area of the base 1150 may be increased correspondingly. In addition, as the area of the base 1150 increases, the area or volume of the camera module may increase. If the width W1 of the protrusion part 1152 exceeds 700 μm, an unit price of the base 1150 may increase. Accordingly, in an embodiment, the width W1 of the protrusion part 1152 is set to have a range from 350 μm to 700 μm.

The frame part 1151 may include an opening 1151-1.

The opening 1151-1 of the frame part 1151 may overlap the filter unit 1140 in an optical axis. In this case, an area of the opening 1151-1 of the frame part 1151 may be smaller than an area of the filter unit 1140. For example, the filter unit 1140 may include a first region overlapping the opening 1151-1 of the frame part 1151, and a second region overlapping an upper surface of the frame part 1151. In addition, the second region of the frame part 1151 may function as a seating part on which the filter unit 1140 is seated.

Meanwhile, the frame part 1151 may include a through hole 1151-2. The through hole 1151-2 may pass through an upper surface and a lower surface of the frame part 1151. The through hole 1151-2 may be an air vent hole for enhancing process reliability in a metal pressing process. The through hole 1151-2 may improve extractability after a metal pressing process for manufacturing the base 1150 is completed. Also, the through hole 1151-2 may remove a gas in a step of bonding or fixing the base 1150 on the circuit board 1160. Accordingly, an embodiment may improve coupling between the circuit board 1160 and the base 1150.

In this case, although the through hole 1151-2 passes only the frame part 1151 of the base 1150, the embodiment is not limited thereto. In detail, although the through hole 1151-2 does not overlap the protrusion part 1152 of the base 1150 in an optical axis, the embodiment is not limited thereto. For example, the through hole 1151-2 may overlap the protrusion part 1152 in an optical axis. Accordingly, the through hole 1151-2 may be formed to penetrate not only the frame part 1151 but also the protrusion part 1152.

In this case, a thickness of the frame part 1151 may be 160 μm or less. For example, a thickness of the frame part 1151 may be 150 μm or less. For example, a thickness of the frame part 1151 may be 140 μm or less.

Preferably, the thickness of the frame part 1151 in the embodiment may satisfy a range of 120 μm to 160 μm.

If the thickness of the frame part 1151 is less than 120 μm, the rigidity of the base 1150 may be weakened. Also, if the thickness of the frame part 1151 is less than 120 μm, metal press processability may be deteriorated due to a decrease in the total thickness of the base 1150. If the thickness of the frame part 1151 is less than 120 μm, the flatness of the filter unit 1140 seated on the frame part 1151 may be deteriorated.

In addition, if the thickness of the frame part 1151 is greater than 160 μm, a flange back length (FBL) may be increased to correspond to an increase in the thickness of the frame part 1151. If the thickness of the frame part 1151 is greater than 160 μm, an effect of reducing the FBL of the embodiment may be insufficient compared to the comparative example.

Meanwhile, in the second embodiment, since the base 1150 is a metal frame manufactured by a metal press method, a total thickness T1 of the base 1150 may be reduced compared to the comparative example. For example, the embodiment does not have to consider the injection properties or extractability as in the comparative example, and accordingly, a total thickness T1 of the base 1150 can be reduced compared to the comparative example.

Accordingly, a total thickness T1 of the base 1150 according to the second embodiment may have a range of 270 μm to 410 μm. That is, the total thickness of the base in the comparative example was about 720 μm. In addition, the embodiment can reduce a total thickness T1 of the base 1150 to a level of 37% to 57% of the thickness of the base of the comparative example. Accordingly, the embodiment may lower the flange back length (FBL). Furthermore, the embodiment may reduce the total thickness or volume of the camera module.

Meanwhile, the filter unit 1140 is disposed on the frame part 1151. In this case, the thickness T3 of the filter unit 1140 may have a range of 100 μm to 140 μm. And, in the FBL of an embodiment, the thickness T3 of the filter unit 1140 may be reflected in the total thickness T1 of the base 1150.

Specifically, when the base 1150, which is a metal frame in the embodiment, is applied, the FBL (Flange Back Length) may be lowered to a level of 0.98.

Meanwhile, the base 1150 may include a coating layer (not shown). For example, the base 1150 is a metal frame formed of a metal material. Accordingly, at least a portion of the base 1150 may not overlap the blocking member 1142 of the filter unit 1140 in an optical axis. As a result, a problem in which the light passing through the lens 110 and the filter unit 1140 is reflected from the base 1150. Also, a flare phenomenon may occur when the light is reflected from the base 1150. Accordingly, an embodiment forms a coating layer on the base 1150. Accordingly, an embodiment may solve a problem in which light is reflected from the base 1150. Accordingly, an embodiment may inhibit a flare phenomenon.

In this case, the coating layer formed on the base 1150 may be a darkened coating layer, but is not limited thereto. For example, the coating layer applied to the base 1150 may be formed of any material having a property of suppressing reflection of light.

Meanwhile, a functional layer that functions to inhibit reflection of the light may be formed on the circuit board 1160 instead of the base 1150.

For example, a masking part (not shown) may be formed on at least a part of a region vertically overlapping the base

1150 among an upper surface of the circuit board 1160. In addition, the masking part may function to block light reflected from the base 1150.

The base 1150 includes a metallic material. Thereby, the base 1150 according to an embodiment may influence an operation of the lens driving device. For example, the base 1150 may generate magnetic interference. For example, the base 1150 may generate interference in an interaction between a coil or a magnet of the lens driving device.

And, when the magnetic interference occurs, there may be a problem that the lens of the embodiment is not moved to a correct position due to the lens driving device. In addition, when position accuracy of the lens decreases, AF characteristics or OIS characteristics may deteriorate.

Accordingly, the base 1150 may be formed of a non-magnetic metal material. However, the embodiment is not limited thereto, and the base 1150 may be formed of a metal material having magnetism that does not cause magnetic interference.

Meanwhile, referring to FIGS. 15(*a*) and 15(*b*), a base 1150A according to the third embodiment may be formed of a die casting method and a metal insert mold (MIM). Accordingly, the design freedom of the base 1150A according to the third embodiment may be higher than the design freedom of the second embodiment.

The base 1150A according to the third embodiment may include a frame part 1151A and a protrusion part 1152A.

The protrusion part 1152A may protrude downward from a lower surface of the frame part 1151A. The protrusion part 1152A in the second embodiment is substantially the same as the protrusion part 1152 in the first embodiment, and thus a detailed description thereof will be omitted.

An upper surface of the frame part 1151A may have a step difference. For example, the upper surface of the frame part 1151A may be divided into a plurality of parts. Preferably, the upper surface of the frame part 1151A may include a first portion 1151A1 and a second portion 1151A2. In addition, both the first portion 1151A1 and the second portion 1151A2 of the upper surface of the frame part 1151A may be flat. In this case, the first portion 1151A1 and the second portion 1151A2 of the frame part 1151A may have a step difference. That is, the upper surface of the first portion 1151A1 of the frame part 1151A may be positioned at a first height. In addition, the upper surface of the second portion 1151A2 of the frame part 1151A may be positioned at a second height higher than the first height.

The first portion 1151A1 of the frame part 1151A may function as a seating part in which the filter unit 1140 is seated. Furthermore, the second portion 1151A2 of the frame part 1151A1 protrudes upward from the first portion 1151A1. Furthermore, the second portion 1151A2 of the frame part 1151A may overlap at least a part of the filter unit 1140 seated on the first portion 1151A1 in a horizontal direction. For example, the second portion 1151A2 of the frame part 1151A may protrude upward from an edge region of the first portion 1151A1. Furthermore, the second portion 1151A2 of the frame part 1151A1 may be disposed to surround a side surface of the filter unit 1140 seated on the first portion 1151A1. Accordingly, the embodiment may stably protect a side portion of the filter unit 1140 from an external environment by using the second portion 1151A2 of the frame part 1151A1.

Figure 16:
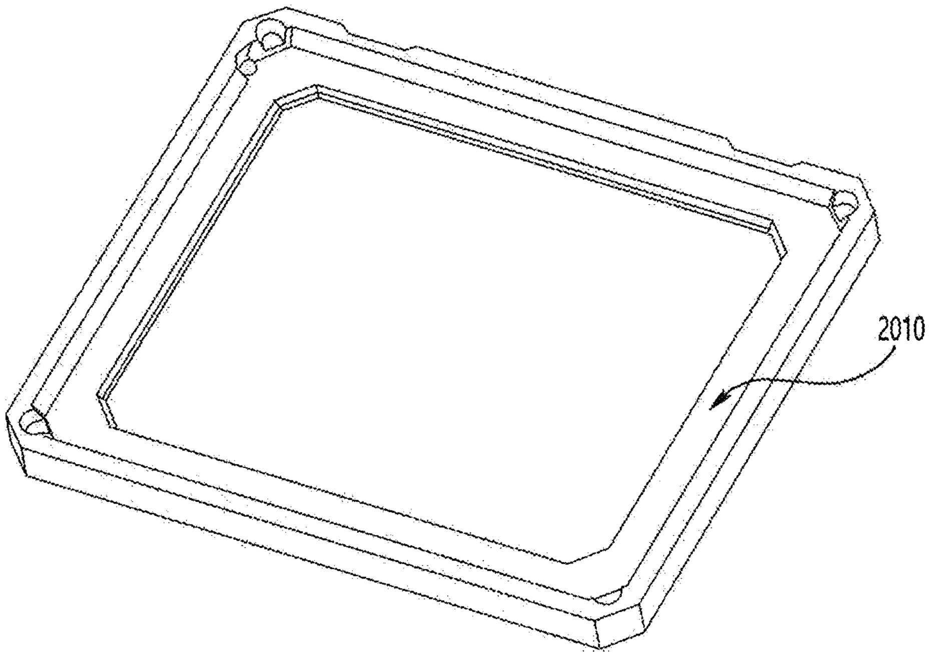
FIG. 16 illustrates a basic structure of a base according to a fourth embodiment.
Figure 17:
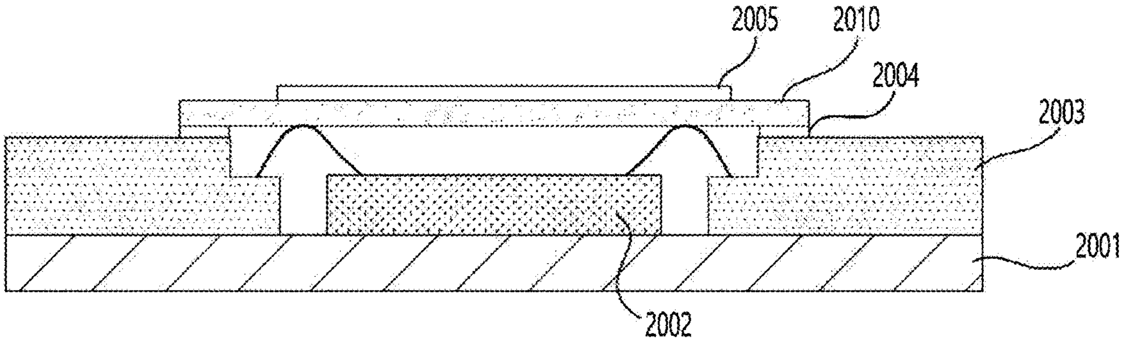
FIG. 17 illustrates a camera module according to a fourth embodiment.
Figure 18:
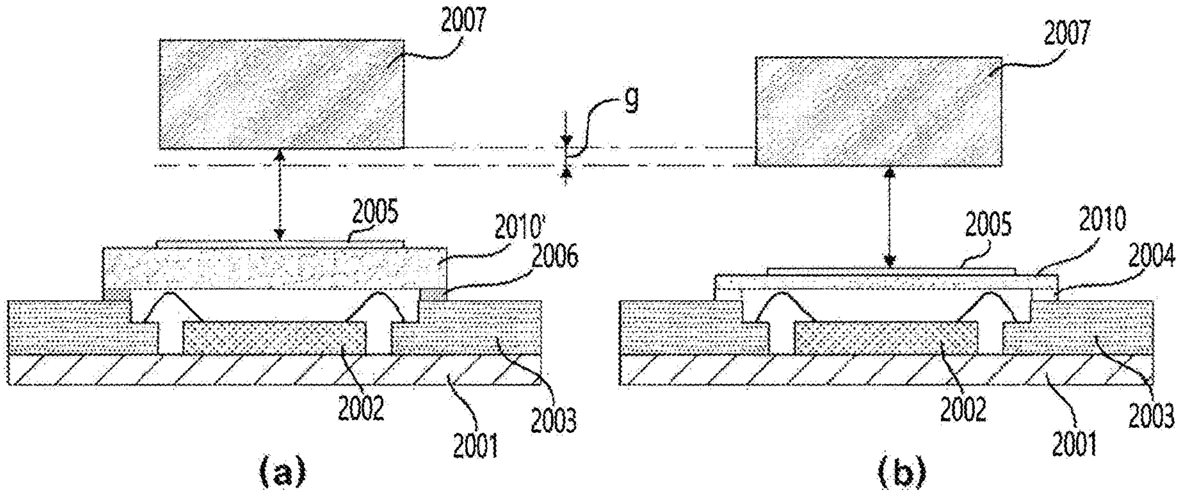
FIG. 18 illustrates a comparison between a structure of a camera module of a comparative example and a structure of a camera module according to a fourth embodiment.

FIG. 16 illustrates a basic structure of a base according to a fourth embodiment, FIG. 17 illustrates a camera module according to a fourth embodiment, and FIG. 18 illustrates a comparison between a structure of a camera module of a comparative example and a structure of a camera module according to a fourth embodiment.

The camera module according to the fourth embodiment may include a reinforcement plate 2001 in which the sensor 2002 is disposed, a circuit board 2003 disposed on the reinforcement plate 2001, a base 2010 disposed on the circuit board 2003, and a filter 2005 disposed on the base 2010.

The camera module may include a reinforcement plate 2001. The reinforcement plate 2001 may be disposed on a lower surface of the circuit board 2003. The reinforcement plate 2001 may be in contact with a lower surface of the circuit board 2003. The reinforcement plate 2001 may be fixed to a lower surface of the circuit board 2003. The reinforcement plate 2001 may be adhered to a lower surface of the circuit board 2003 using an adhesive.

The sensor 2002 may be disposed on the reinforcement plate 2001. The sensor 2002 may be disposed on the reinforcement plate 2001 by soldering. The sensor 2002 may be electrically connected to the circuit board 2003 through wire bonding. The sensor 2002 may be electrically connected to the circuit board 2003.

Light passing through the lens 2007 and the filter 2005 may be incident on the sensor 2002 to form an image. The sensor 2002 may include an effective image region.

The camera module may include a circuit board 2003. The circuit board 2003 may be a printed circuit board (PCB). The circuit board 2003 may be connected to the sensor 2002. The circuit board 2003 may include a first hole. The first hole may be a hollow. The sensor 2002 may be disposed in the first hole of the circuit board 2003. The sensor 2002 may be accommodated in the first hole of the circuit board 2003. The base 2010 may be disposed on one surface of the first hole of the circuit board 2003.

The circuit board 2003 may include a first portion connected to the sensor 2002 by a wire and a second portion on which the base 2010 is disposed. The circuit board 2003 may include a first portion spaced apart from the base 2010 in the optical axis direction and a second portion on which the base 2010 is disposed. The circuit board 2003 may be formed in a stepped structure consisting of a first portion disposed at a first end and a second portion disposed at a second end. The circuit board 2003 may be formed in a stepped structure. The first portion of the circuit board 2003 may be disposed closer to the sensor 2002 than the second portion. The first portion of the circuit board 2003 may protrude in a direction in which the sensor 2002 is disposed rather than the second portion.

The camera module may include a base 2010. The base 2010 may be disposed on the circuit board 2003. The base 2010 may be soldered and coupled to the circuit board 2003. The solder 2004 may be disposed between the base 2010 and the circuit board 2003. The base 2010 may include a second hole formed at a position corresponding to the sensor 2002. The base 2010 may include a second hole in which the filter 2005 is disposed. An upper surface of the base 2010 may be formed in a recess structure. The second hole of the base 2010 may be formed to be recessed more than an edge region.

In FIG. 17, the filter 2005 is disposed on one side of the base 2010 to show the filter 2005 when viewed from a side, but when the base 2010 is formed in a structure as shown in FIG. 16, the filter 2005 may not show from the side.

The base 2010 may be formed of a metal material to correspond to the base of the second and third embodiments. The base 2010 may be formed of a material having high rigidity.

Since a base 2010' in a prior art is formed of an injection-molded structure, it could not be reduced to less than a certain thickness, and as the thickness was reduced, the rigidity decreased, resulting in a problem of bending.

The base 2010 according to a fourth embodiment may be formed of a metal material to reduce a thickness thereof while maintaining an existing rigidity. The base 2010 may be formed of a metal material having high rigidity, and thus, a problem that the base 2010 is bent may be inhibited even when a thickness thereof is reduced. In addition, it can be advantageous in terms of freedom of lens design as it can reduce the FBL (Flange Back Length), which is a distance between the image sensor and a lens joints. In addition, there is an effect of being able to miniaturize the camera module as the thickness of the sensor base is reduced. Referring to FIG. 18, a base 2010 formed of a metal material can miniaturize of a camera module by a first length (g) that is reduced from a thickness of the base 2010'.

The base 2010' of the existing injected structure is bonded to the sensor substrate with epoxy 2006, but according to the present embodiment, the base 2010 made of a metal material may be soldered and disposed on the circuit board 2003.

The base 2010 may have a thickness of 0.1 mm or more and 0.4 mm or less based on the optical axis direction. Since the filter 2005 may be 0.1 mm or more on based on the optical axis direction, the base 2010 may be formed to have a thickness of 0.1 mm or more, which is the minimum thickness of the filter 2005. The base 2010 according to the present embodiment can be reduced by about 50% in thickness compared to the base 2010' manufactured by injection molding with the same rigidity.

The camera module may include a filter 2005. The filter 2005 may be disposed between the lens 2007 and the sensor 2002. The filter 2005 may be disposed on the base 2010. Although FIG. 18 shows that the filter 2005 is disposed on the base 2010, the filter 2005 may be disposed to be accommodated in the base 2010. In this case, when viewed from the side, the filter 2005 may not be visible. The filter 2005 may block light of a specific frequency band from entering the sensor 2002 from light passing through the lens 2007. The filter 2005 may include an infrared blocking filter. The filter 2005 may block infrared rays from being incident on the sensor 2002. The filter 2005 may have a thickness of at least 0.1 mm based on the optical axis direction. Also, the filter 2005 may have a thickness of 0.1 mm to 0.2 mm based on the optical axis direction.

In the case of a sensor base made of an existing injection, an image sensor is mounted on a plate member, and a sensor base assembly, which includes the sensor base and filter, is attached to the sensor substrate with epoxy after die bonding and wire bonding processes of an image sensor.

Figure 19:
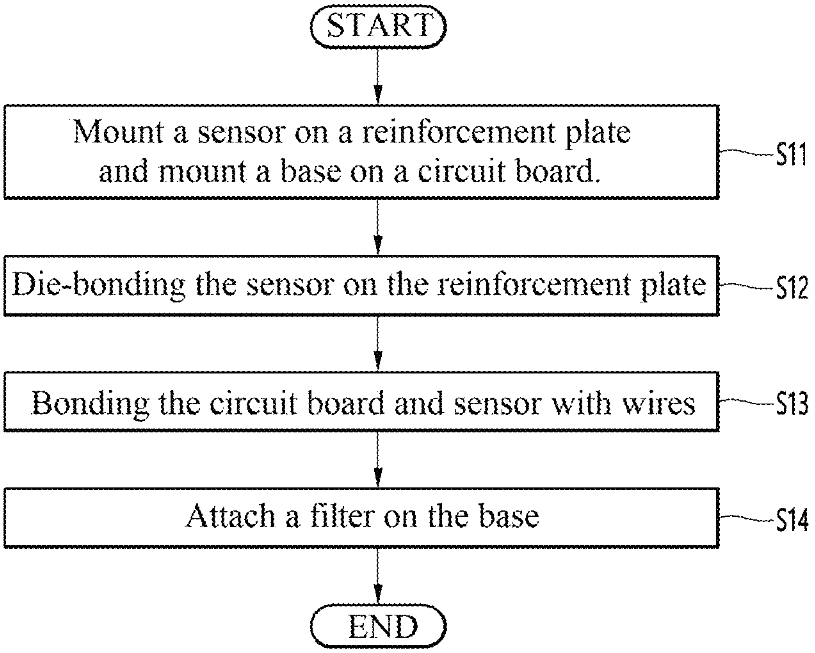
FIG. 19 is a flowchart of a camera module manufacturing method according to a fourth embodiment.

FIG. 19 is a flowchart of a camera module manufacturing method according to a fourth embodiment.

In the fourth embodiment, as the base 2010 is formed of a metal material, a manufacturing process of the camera module may be as follows. In step S11, the sensor 2002 may be mounted on the reinforcement plate 2001, the base 2010 may be soldered to the circuit board 2003. In step S12, the sensor 2002 may be die-bonded to the reinforcement plate 2001. In step S13, the sensor 2002 and the circuit board 2003 may be wire-bonded, and in step S14, the filter 2005 may be disposed on the base 2010.

Figure 20:
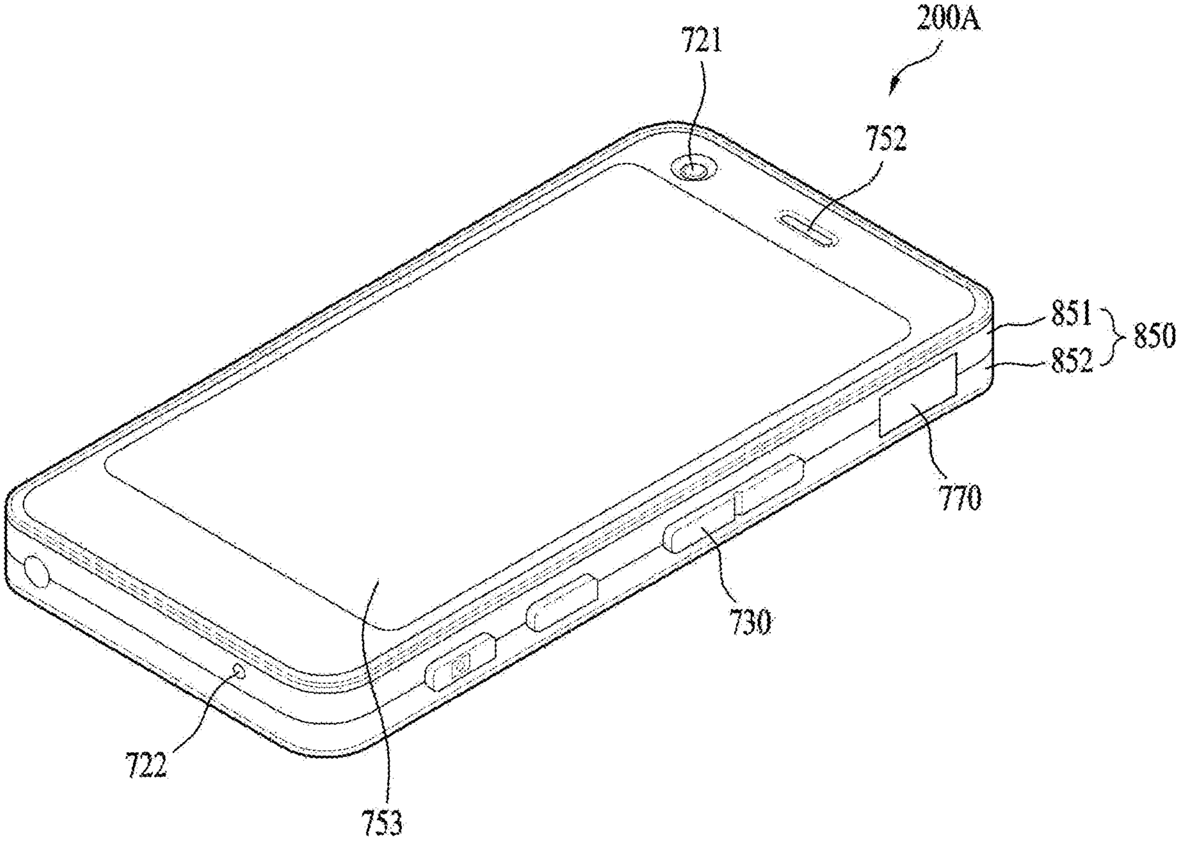
FIG. 20 is a perspective view of a portable terminal according to an embodiment.
Figure 21:
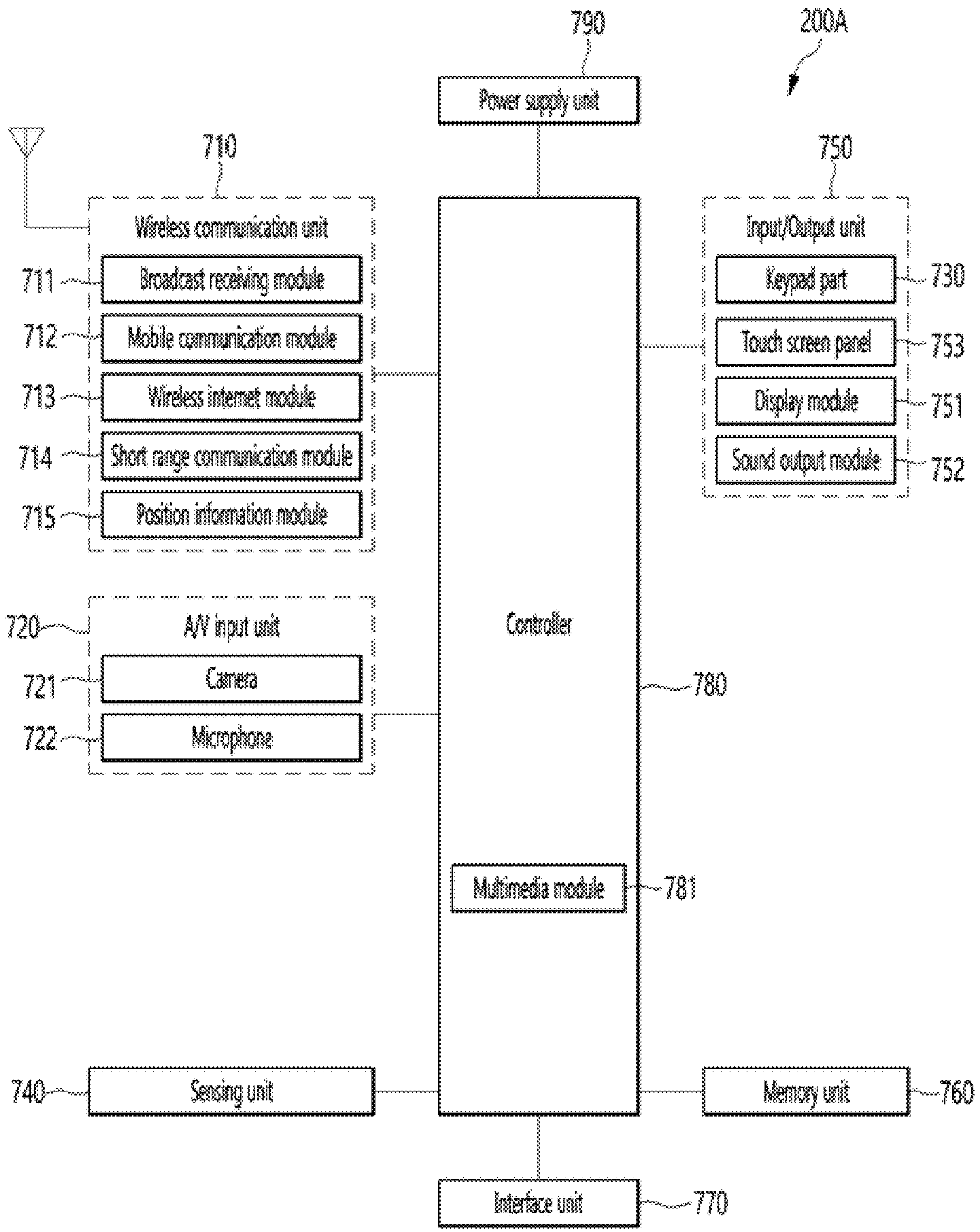
FIG. 21 is a configuration diagram of a portable terminal shown in FIG. 20.

FIG. 20 is a perspective view of a portable terminal 200A according to an embodiment, and FIG. 21 is a configuration diagram of a portable terminal shown in FIG. 20.

Referring to FIGS. 20 and 21, a portable terminal (200A, hereinafter referred to as a "terminal") may include a body 850, a wireless communication unit 710, an A/V input unit 720, a sensing unit 740, an input/output unit 750, a memory unit 760, an interface unit 770, a control unit 780, and a power supply unit 790.

The body 850 shown in FIG. 10 is in the form of a bar, but is not limited thereto, and there may be various structures such as a slide type, a folder type, a swing type, a swivel type, in which two or more sub-bodies are coupled to be movable relative to each other.

The body 850 may include a case (casing, housing, cover, etc.) forming an exterior. For example, the body 850 may be divided into a front case 851 and a rear case 852. Various electronic components of the terminal may be embedded in a space formed between the front case 851 and the rear case 852.

The wireless communication unit 710 may include one or more modules that enable wireless communication between the terminal 200A and the wireless communication system or between the terminal 200A and the network in which the terminal 200A is located. For example, the wireless communication unit 710 may include a broadcast reception module 711, a mobile communication module 712, a wireless internet module 713, a short-range communication module 714, and a location information module 715.

The A/V (Audio/Video) input unit 720 is for inputting an audio signal or a video signal, and may include a camera 721 and a microphone 722 and the like.

The camera 721 may include a camera module according to the embodiment shown in FIG. 1.

The sensing unit may detect a current state of the terminal 200A, such as an opening/closing state of the terminal 200A, a position of the terminal 200A, a presence or absence of user contact, an orientation of the terminal 200A, acceleration/deceleration of the terminal 200A, etc. and generate a sensing signal for controlling the operation of the terminal 200A. For example, when the terminal 200A is in the form of a slide phone, it is possible to sense whether the slide phone is opened or closed. In addition, it is responsible for sensing functions related to whether the power supply unit 790 is supplied with power, whether the interface unit 770 is coupled to an external device, and the like.

The input/output unit 750 is for generating input or output related to sight, hearing, or touch. The input/output unit 750 may generate input data for operation control of the terminal 200A, and may also display information processed by the terminal 200A.

The input/output unit 750 may include a keypad unit 730, a display module 751, a sound output module 752, and a touch screen panel 753. The keypad unit 730 may generate input data in response to a keypad input.

The display module 751 may include a plurality of pixels whose color changes according to an electrical signal. For example, the display module 751 may include at least of a liquid crystal display, a thin film transistor-liquid crystal display, an organic light-emitting diode, a flexible display, three-dimensional display (3D display).

The sound output module 752 may output audio data received from the wireless communication unit 710 in a call signal reception, a call mode, a recording mode, a voice recognition mode, or a broadcast reception mode, or the like; or audio data stored in the memory unit 760.

The touch screen panel 753 may convert a change in capacitance generated due to a user's touch on a specific region of the touch screen into an electrical input signal.

The memory unit 760 may store a program for processing and control of the controller 780, and may temporarily store input/output data (e.g., phone book, message, audio, still image, photo, video, etc.). For example, the memory unit 760 may store an image captured by the camera 721, for example, a photo or a moving picture.

The interface unit 770 serves as a passage for connecting with an external device connected to the terminal 200A. The interface unit 770 receives data from an external device, receives power and transmits it to each component inside the terminal 200A, or transmits data of the terminal 200A to an external device. For example, the interface unit 770 may include a wired/wireless headset port, an external charger port, a wired/wireless data port, a memory card port, a port for connecting a device having an identification module, and an audio I/O (Input/Output) port, video I/O (Input/Output) port, and an earphone port, and the like.

The controller (controller, 780) may control the overall operation of the terminal 200A. For example, the controller 780 may perform related control and processing for voice calls, data communications, video calls, and the like.

The controller 780 may include a multimedia module 781 for playing multimedia. The multimedia module 781 may be implemented within the controller 180 or may be implemented separately from the controller 780.

The controller 780 may perform a pattern recognition process capable of recognizing a handwriting input or a drawing input performed on the touch screen as characters and images, respectively.

The power supply unit 790 may receive external power or internal power under the control of the control unit 780 to supply power required for the operation of each component.

Although the embodiments of the present invention have been described with reference to the accompanying drawings, those skilled in the art to which the present invention pertains will be understood that the present invention may be implemented in other specific forms without modifying the technical spirit and essential features of the present invention. Therefore, it should be understood that the embodiments described above are illustrative in all aspects and not restrictive.

The invention claimed is:

1. A camera module comprising:

a reinforcement plate;

a circuit board disposed on the reinforcement plate and including a cavity;

a sensor disposed in a region of an upper surface of the reinforcement plate that overlaps the cavity of the circuit board along an optical axis;

a base disposed on the circuit board; and a filter unit disposed on the base and overlapping the sensor along the optical axis, wherein the base is a metal frame including a metal material, wherein the filter unit overlaps the metal frame along the optical axis, wherein the metal frame of the base includes a frame part and a protrusion part protruding toward the sensor from an edge region of a lower surface of the frame part, and wherein the filter unit is disposed on an upper surface of the frame part.

2. The camera module of claim 1, wherein the upper surface of the frame part is flat.

3. The camera module of claim 2, wherein the base does not overlap the filter unit in a direction perpendicular to the optical axis.

4. The camera module of claim 1, wherein the frame part includes an opening overlapping the sensor and the filter unit along the optical axis, and wherein an area of the opening of the frame part is smaller than an area of the filter unit.

5. The camera module of claim 1, comprising:

a connection member connecting a terminal of the sensor and a pad of the circuit board, wherein an uppermost end of the connection member is positioned higher than an upper surface of the circuit board, and wherein the upper surface of the frame part is positioned higher than the uppermost end of the connection member.

6. The camera module of claim 5, wherein a thickness of the protrusion part is within a range of 150 μm to 250 μm.

7. The camera module of claim 4, wherein the base includes a through hole passing through the frame part.

8. The camera module of claim 1, wherein a thickness of the frame part is within a range of 120 μm to 160 μm.

9. The camera module of claim 1, wherein a total thickness of the base including the frame part and the protrusion part is within a range of 270 μm to 410 μm.

10. The camera module of claim 1, wherein the upper surface of the frame part has a step difference.

11. The camera module of claim 10, wherein the upper surface of the frame part includes a first portion having a first height, and a second portion having a step difference with the first portion and a second height higher than the first height, and wherein the filter unit is disposed on the first portion of the frame part.

12. The camera module of claim 1, wherein the base includes a nonmagnetic metallic material.

13. The camera module of claim 1, comprising:

an adhesive member disposed between the circuit board and the base.

14. The camera module of claim 13, wherein the circuit board includes a ground pattern, and wherein the adhesive member is disposed on the ground pattern.

15. The camera module of claim 7, wherein the opening of the frame part and the through hole of the frame part are spaced apart from each other.

16. The camera module of claim 1, wherein the sensor is disposed in the cavity of the circuit board and overlaps the circuit board along a horizontal direction.

17. The camera module of claim 1, wherein the base is bonded to the circuit board by soldering.

18. The camera module of claim 1, wherein the circuit board includes a first portion connected to the sensor through a connection member, and a second portion on which the base is disposed, and wherein the first portion of the circuit board and the second portion of the circuit board have a step structure.

19. An optical device comprising:

a body, and the camera module of claim 1 disposed in the body and configured to photograph an image of a subject, and a display unit configured to output the image photographed by the camera module, wherein the camera module comprises:

a lens unit disposed on the filter unit; and a lens driving device adapted to move the lens unit in at least one of an optical axis direction and a direction perpendicular to the optical axis direction.

* * * * *